(12) United States Patent
Nakaie et al.

(10) Patent No.: US 9,134,671 B2
(45) Date of Patent: Sep. 15, 2015

(54) IMAGE READING DEVICE AND IMAGE FORMING APPARATUS

(75) Inventors: Katsuhiko Nakaie, Kanagawa (JP); Masao Ito, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 243 days.

(21) Appl. No.: 13/597,656

(22) Filed: Aug. 29, 2012

(65) Prior Publication Data

US 2013/0258420 A1 Oct. 3, 2013

(30) Foreign Application Priority Data

Mar. 29, 2012 (JP) .................................. 2012-075434

(51) Int. Cl.
*H04N 1/04* (2006.01)
*G03G 15/00* (2006.01)
*H04N 1/028* (2006.01)

(52) U.S. Cl.
CPC ....... *G03G 15/5062* (2013.01); *H04N 1/02855* (2013.01); *H04N 1/02865* (2013.01); *H04N 1/02895* (2013.01)

(58) Field of Classification Search
CPC combination set(s) only.
See application file for complete search history.

(56) References Cited

U.S. PATENT DOCUMENTS

| 5,218,413 A | 6/1993 | Kanai |
| 5,760,944 A * | 6/1998 | Minakuchi et al. ........ 359/211.1 |
| 2002/0097511 A1 | 7/2002 | Kanematsu et al. |
| 2005/0128597 A1 | 6/2005 | Amanai |
| 2006/0268568 A1 | 11/2006 | Oku et al. |
| 2009/0034024 A1 | 2/2009 | Kim et al. |
| 2009/0257463 A1 * | 10/2009 | Kusukame et al. ............. 372/22 |
| 2009/0310193 A1 * | 12/2009 | Endo et al. ..................... 358/474 |
| 2010/0232834 A1 * | 9/2010 | Ishida ............................ 399/144 |
| 2011/0096374 A1 | 4/2011 | Takahashi et al. |

FOREIGN PATENT DOCUMENTS

| JP | 04-068856 A | 3/1992 |
| JP | 04-264417 A | 9/1992 |
| JP | 05-034612 A | 2/1993 |
| JP | 2000-066129 A | 3/2000 |
| JP | 2001-229722 A | 8/2001 |
| JP | 2002-228907 A | 8/2002 |

(Continued)

OTHER PUBLICATIONS

Australian Office Action issued Nov. 11, 2013 in corresponding Australian Patent Application No. 2012227364.

*Primary Examiner* — Chuong A Ngo
*Assistant Examiner* — Idowu O Osifade
(74) *Attorney, Agent, or Firm* — Sughrue Mion, PLLC

(57) ABSTRACT

An image reading device includes a light source member having a substrate extending in a predetermined main scanning direction, and light source portions releasing light and supported by the substrate in the main scanning direction; a light guide member that has an input section disposed facing the light source portions and receiving the light, and an output section outputting the light, and that guides the light toward a predetermined radiation position; a support member supporting the light source member and the light guide member and having higher rigidity than the light guide member and the substrate; a first positioning section positioning the light guide member in the main scanning direction and a sub scanning direction; a second positioning section positioning the light guide member in the sub scanning direction; and a reader member receiving the light from the radiation position so as to read an image thereof.

14 Claims, 23 Drawing Sheets

(56) References Cited

FOREIGN PATENT DOCUMENTS

| JP | 2002-333563 A | 11/2002 |
| JP | 2004-088713 A | 3/2004 |
| JP | 2005-103825 A | 4/2005 |
| JP | 2007-158751 A | 6/2007 |
| JP | 2007-187776 A | 7/2007 |
| JP | 2008-096573 A | 4/2008 |

* cited by examiner

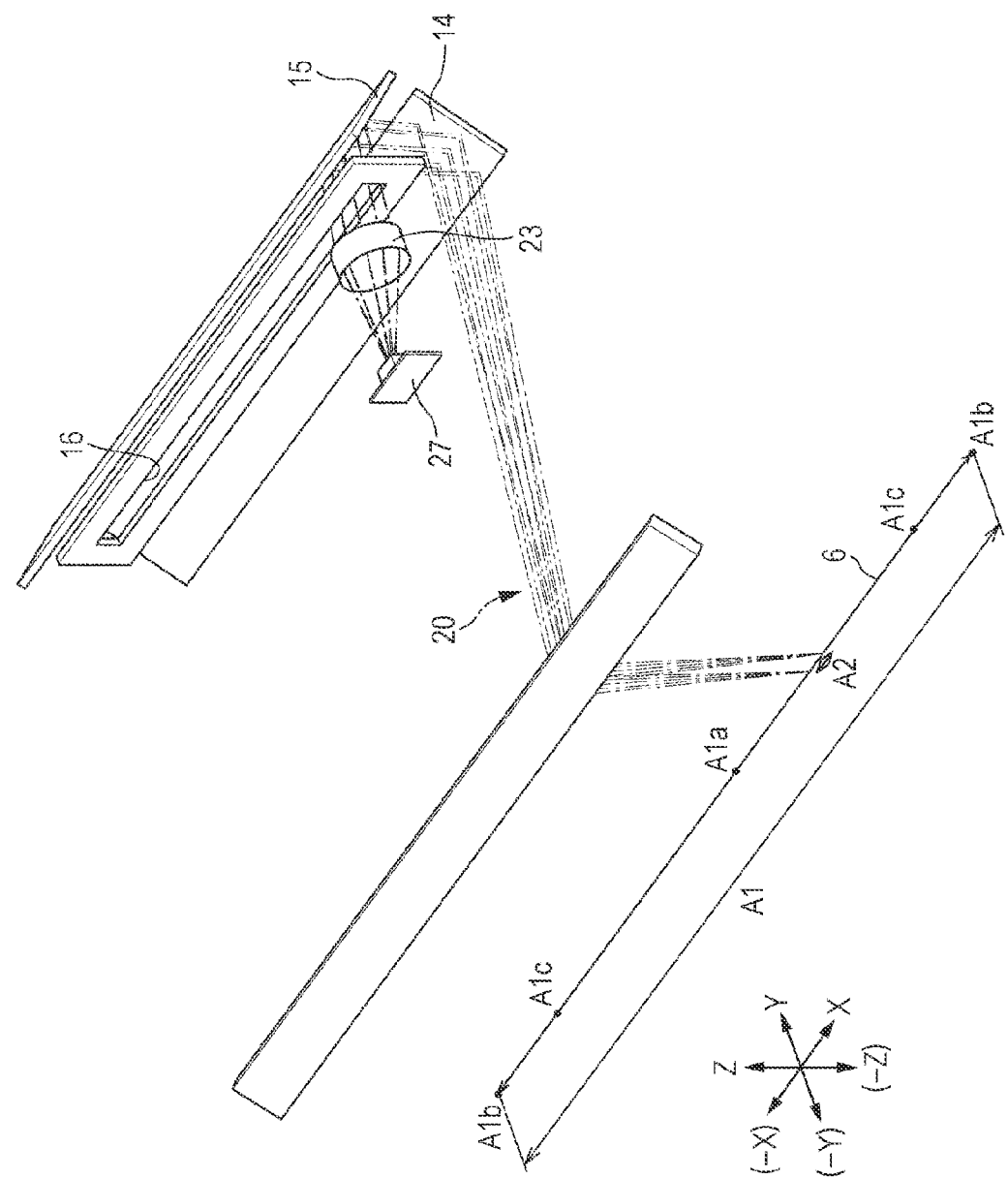

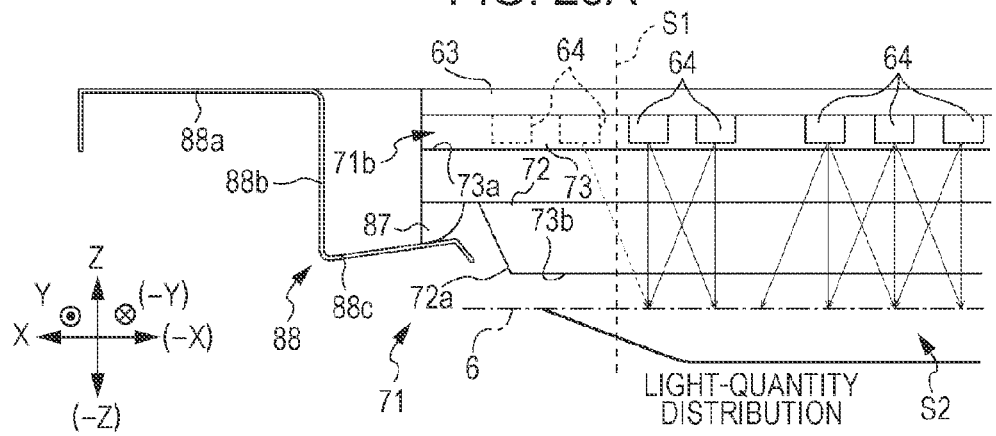
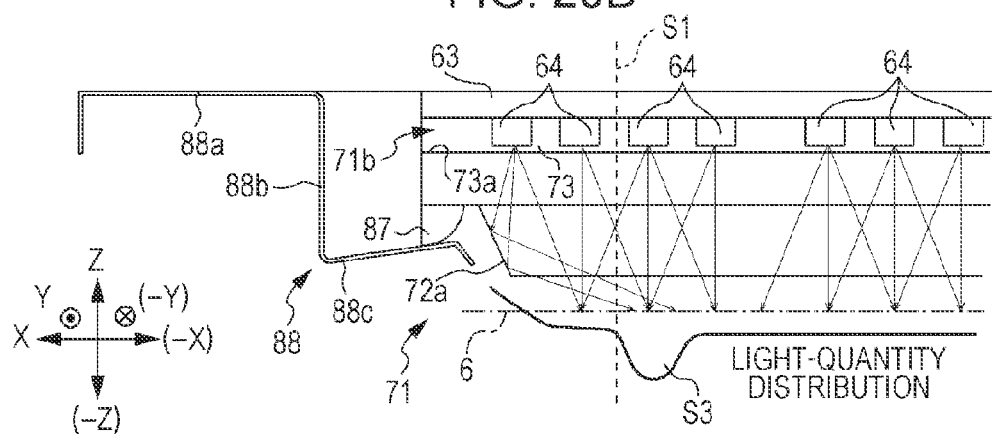
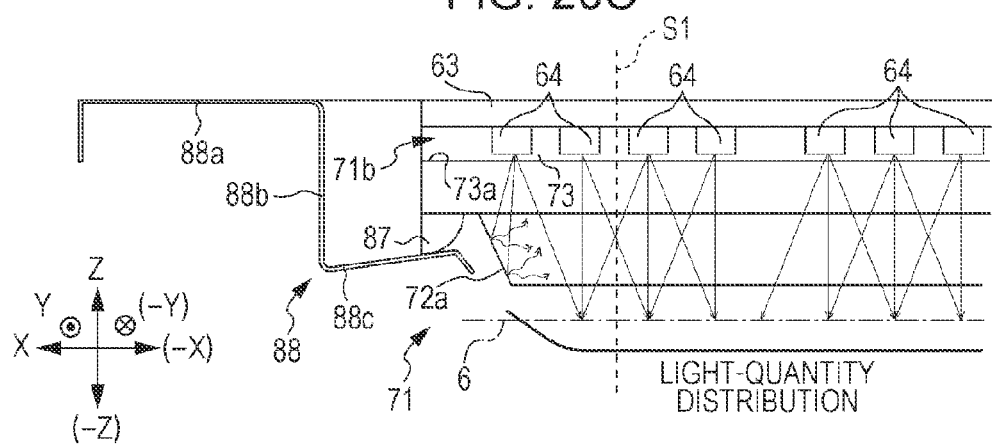

IMAGE READING DEVICE AND IMAGE FORMING APPARATUS

CROSS-REFERENCE TO RELATED APPLICATIONS

This application is based on and claims priority under 35 USC 119 from Japanese Patent Application No. 2012-075434 filed Mar. 29, 2012.

BACKGROUND

Technical Field

The present invention relates to image reading devices and image forming apparatuses.

SUMMARY

According to an aspect of the invention, there is provided an image reading device including a light source member, a light guide member, a support member, a first positioning section, a second positioning section, and a reader member. The light source member has a plate-shaped substrate extending in a predetermined main scanning direction and multiple light source portions releasing light and supported by the substrate in the main scanning direction. The light guide member has an input section disposed facing the light source portions and to which the light released from the light source portions is input, and an output section from which the input light is output. Moreover, the light guide member guides the light toward a predetermined radiation position. The support member supports the light source member and the light guide member and has higher rigidity than the light guide member and the substrate of the light source member. The first positioning section is provided in a central area of the support member in the main scanning direction and positions the light guide member in the main scanning direction and a sub scanning direction intersecting the main scanning direction. The second positioning section is provided at an end of the support member in the main scanning direction and positions the light guide member in the sub scanning direction. The reader member receives the light from the radiation position so as to read an image of the radiation position.

BRIEF DESCRIPTION OF THE DRAWINGS

Exemplary embodiments of the present invention will be described in detail based on the following figures, wherein:

FIG. 5 illustrates the second reader system in the image reading device according to the first exemplary embodiment;

FIGS. 20A to 20C illustrate light-quantity distribution of light radiated from the lamp, FIG. 20A illustrating a case where there are no light source portions disposed outside the outer edges of a maximum-size recording sheet, FIG. 20B illustrating a case where a configuration for reducing reflection is not provided at each of inclined surfaces of the light guide member, FIG. 20C illustrating light-quantity distribution in the configuration according to the first exemplary embodiment;

DETAILED DESCRIPTION

Figure 1:
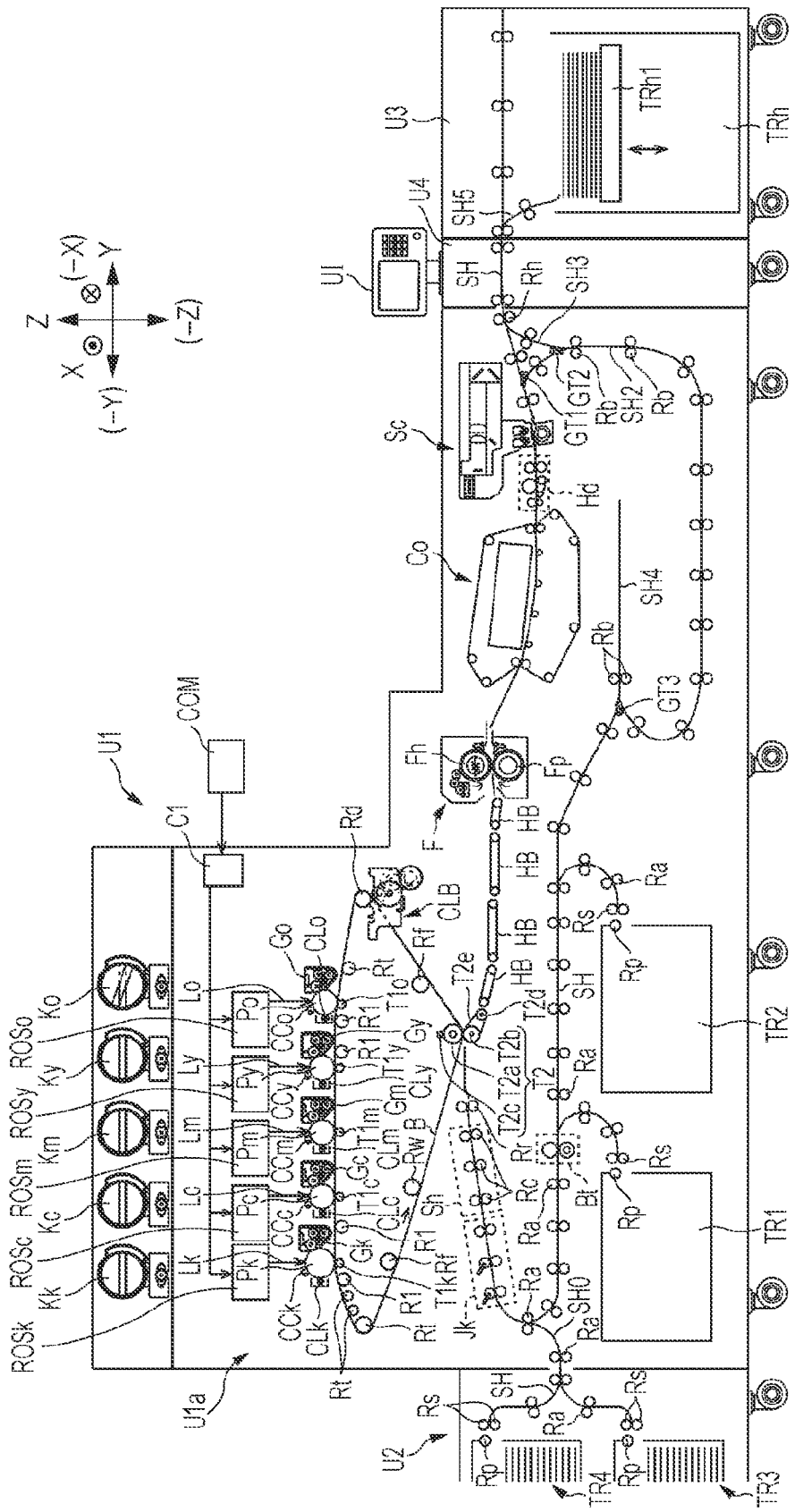
FIG. 1 is an overall view of an image forming apparatus according to a first exemplary embodiment of the present invention.

Although exemplary embodiments of the present invention will be described in detail below with reference to the drawings, the present invention is not to be limited to the following exemplary embodiments.

In order to provide an easier understanding of the following description, the front-rear direction will be defined as "X-axis direction" in the drawings, the left-right direction will be defined as "Y-axis direction", and the up-down direction will be defined as "Z-axis direction". Moreover, the directions or the sides indicated by arrows X, −X, Y, −Y, Z, and −Z are defined as forward, rearward, rightward, leftward, upward, and downward directions, respectively, or as front, rear, right, left, upper, and lower sides, respectively.

Furthermore, in each of the drawings, a circle with a dot in the center indicates an arrow extending from the far side toward the near side of the plane of the drawing, and a circle with an "x" therein indicates an arrow extending from the near side toward the far side of the plane of the drawing.

In the drawings used for explaining the following description, components other than those for providing an easier understanding of the description are omitted where appropriate.

First Exemplary Embodiment

Overall Configuration of Printer U According to First Exemplary Embodiment

FIG. 1 is an overall view of an image forming apparatus according to a first exemplary embodiment of the present invention.

Figure 2:
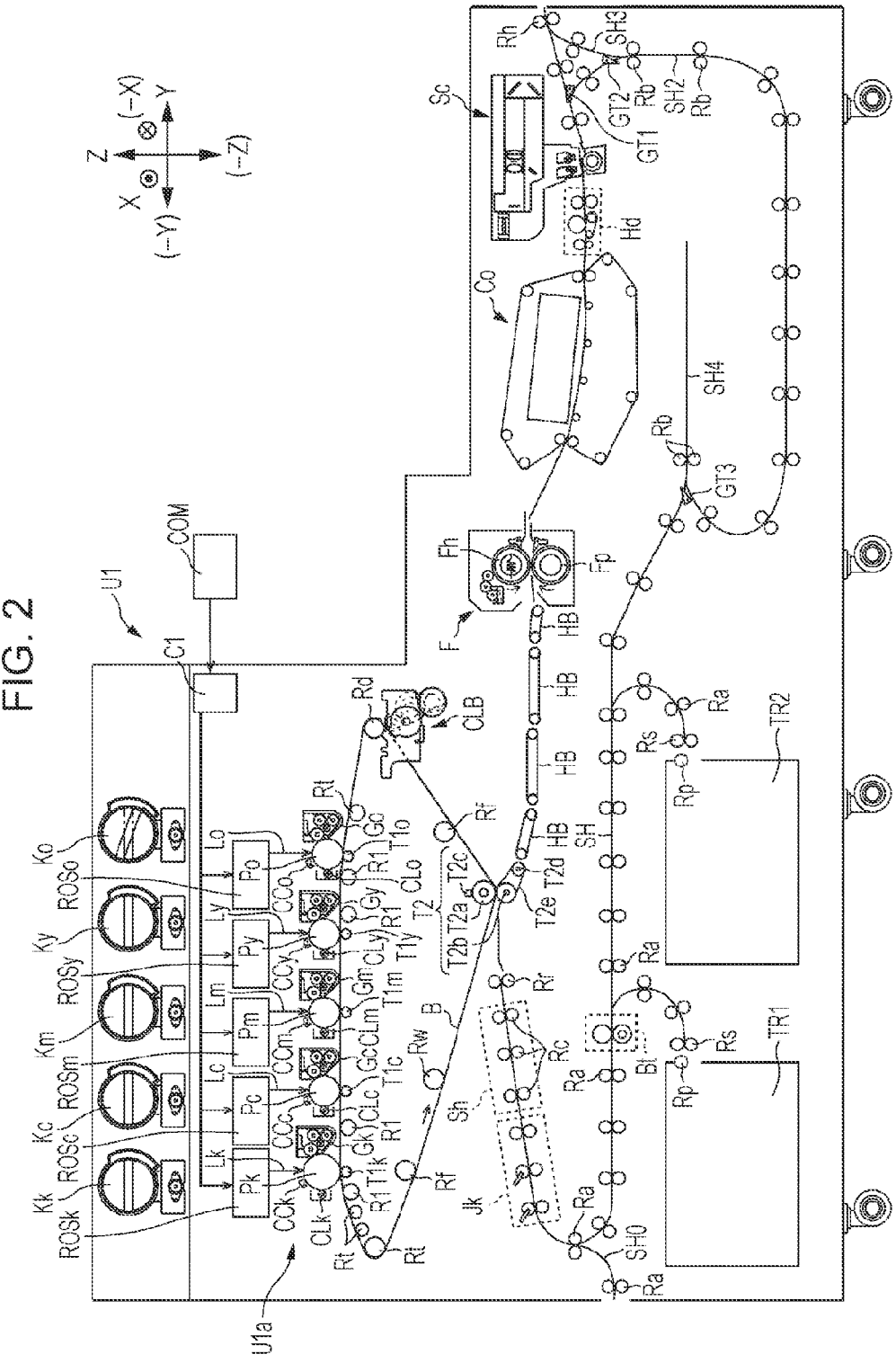
FIG. 2 illustrates a relevant part of the image forming apparatus according to the first exemplary embodiment of the present invention.

FIG. 2 illustrates a relevant part of the image forming apparatus according to the first exemplary embodiment of the present invention.

Referring to FIGS. 1 and 2, a printer U as an example of an image forming apparatus according to the first exemplary embodiment includes an image forming apparatus body U1, a feeder unit U2 as an example of a feeding device that feeds a medium to the image forming apparatus body U1, an output unit U3 as an example of an output device to which a medium having an image recorded thereon is output, an interface module U4 as an example of a connector that connects the body U1 and the output unit U3, and an operable unit UI operable by a user.

Configuration of Marking Unit in First Exemplary Embodiment

Referring to FIGS. 1 and 2, the image forming apparatus body U1 includes a controller C1 that controls the printer U, a communicator (not shown) that receives image information transmitted from a print image server COM as an example of an information transmitter externally connected to the printer U via a dedicated cable (not shown), and a marking unit U1a as an example of an image recorder that records an image onto a medium. The print image server COM is connected, via a line such as a cable or a local area network (LAN), to a personal computer PC as an example of an image transmitter that transmits information of an image to be printed in the printer U.

The marking unit U1a includes photoconductor drums Py, Pm, Pc, and Pk as an example of image bearing members for yellow (Y), magenta (M), cyan (C), and black (K) colors, and a photoconductor drum Po for giving glossiness to an image if the image to be printed is a photographic image or the like. The photoconductor drums Py to Po have photoconductive dielectric surfaces.

Referring to FIGS. 1 and 2, in the rotational direction of the photoconductor drum Pk for the black color, a charger CCk, an exposure unit ROSk as an example of a latent-image forming unit, a developing unit Gk, a first-transfer roller T1k as an example of a first-transfer unit, and a photoconductor cleaner CLk as an example of an image-bearing-member cleaner are arranged around the photoconductor drum Pk.

Likewise, chargers CCy, CCm, CCc, and CCo, exposure units ROSy, ROSm, ROSc, and ROSo, developing units Gy, Gm, Gc, and Go, first-transfer rollers T1y, T1m, T1c, and T1o, and photoconductor cleaners CLy, CLm, CLc, and CLo are respectively arranged around the remaining photoconductor drums Py, Pm, Pc, and Po.

Toner cartridges Ky, Km, Kc, Kk, and Ko as an example of containers that accommodate therein developers to be supplied to the developing units Gy to Go are detachably supported above the marking unit U1a.

An intermediate transfer belt B as an example of an intermediate transfer body is disposed below the photoconductor drums Py to Po. The intermediate transfer belt B is interposed between the photoconductor drums Py to Po and the first-transfer rollers T1y to T1o. The undersurface of the intermediate transfer belt B is supported by a drive roller Rd as an example of a drive member, a tension roller Rt as an example of a tension applying member, a working roller Rw as an example of a meander prevention member, multiple idler rollers Rf as an example of driven members, a backup roller T2a as an example of a second-transfer opposing member, multiple retracting rollers R1 as an example of movable members, and the aforementioned first-transfer rollers T1y to T1o.

A belt cleaner CLB as an example of an intermediate-transfer-body cleaner is disposed on the top surface of the intermediate transfer belt B near the drive roller Rd.

A second-transfer roller T2b as an example of a second-transfer member is disposed facing the backup roller T2a with the intermediate transfer belt B interposed therebetween. The backup roller T2a is in contact with a contact roller T2c as an example of a contact member for applying a voltage having a reversed polarity relative to the charge polarity of the developers to the backup roller T2a. In the first exemplary embodiment, a transport belt T2e as an example of a transport member is bridged between the second-transfer roller T2b and a drive roller T2d as an example of a drive member disposed at the lower right side thereof.

The backup roller T2a, the second-transfer roller T2b, and the contact roller T2c constitute a second-transfer unit T2 according to the first exemplary embodiment. The first-transfer rollers T1y to T1o, the intermediate transfer belt B, the second-transfer unit T2, and the like constitute a transfer device T1+B+T2 according to the first exemplary embodiment.

Feed trays TR1 and TR2 as an example of containers that accommodate therein recording sheets S as an example of media are provided below the second-transfer unit T2. A pickup roller Rp as an example of a fetching member and a separating roller Rs as an example of a separating member are disposed at the upper right side of each of the feed trays TR1 and TR2. A transport path SH that transports each recording sheet S extends from the separating roller Rs. Multiple transport rollers Ra as an example of transport members that transport each recording sheet S downstream are arranged along the transport path SH.

A deburring unit Bt as an example of an unwanted-part remover is disposed at the downstream side, in the transport direction of each recording sheet S, of a merging point of the transport paths SH from the two feed trays TR1 and TR2. Specifically, the deburring unit Bt performs so-called deburring by transporting each recording sheet S downstream while nipping the recording sheet S with a predetermined pressure so as to remove an unwanted part from an edge of the recording sheet S.

A multi-feed detector Jk is disposed at the downstream side of the deburring unit Bt and detects whether a stack of multiple recording sheets S are multi-fed by measuring the thickness of the recording sheet or sheets S traveling therethrough. Correcting rollers Rc as an example of an orientation correcting unit that corrects a so-called skew, i.e., inclination, of each recording sheet S relative to the transport direction thereof are disposed at the downstream side of the multi-feed detector Jk. A registration roller Rr as an example of an adjusting member that adjusts the timing for transporting each recording sheet S toward the second-transfer unit T2 is disposed at the downstream side of the correcting rollers Rc.

The feeder unit U2 is similarly provided with components, such as feed trays TR3 and TR4, which have configurations similar to those of the feed trays TR1 and TR2, the pickup rollers Rp, the separating rollers Rs, and the transport rollers Ra. A transport path SH from the feed trays TR3 and TR4 merges with the transport path SH in the image forming apparatus body U1 at the upstream side of the multi-feed detector Jk.

Multiple transport belts HB that support each recording sheet S on the surfaces thereof so as to transport the recording sheet S downstream are arranged at the downstream side of the transport belt T2e in the transport direction of the recording sheet S.

A fixing device F is disposed at the downstream side of the transport belts HB in the transport direction of the recording sheet S.

A cooling device Co that cools the recording sheet S is disposed at the downstream side of the fixing device F.

A decurler Hd as an example of a bent-medium corrector that corrects a so-called curl, i.e., bending, of the recording sheet S by applying pressure to the recording sheet S is disposed at the downstream side of the cooling device Co.

An image reading device Sc that reads an image recorded on the recording sheet S is disposed at the downstream side of the decurler Hd.

An inversion path SH2 as an example of a transport path that diverges from the transport path SH extending toward the interface module U4 is formed at the downstream side of the image reading device Sc. A first gate GT1 as an example of a transport-direction switching member is disposed at the diverging point of the inversion path SH2.

Multiple switchback rollers Rb as an example of transport members that are rotatable in forward and reverse directions are arranged along the inversion path SH2. A connection path SH3 as an example of a transport path that diverges from an upstream section of the inversion path SH2 and merges with the transport path SH at the downstream side of the diverging point of the inversion path SH2 is formed at the upstream side of the switchback rollers Rb. A second gate GT2 as an example of a transport-direction switching member is disposed at the diverging point between the inversion path SH2 and the connection path SH3.

At the downstream side of the inversion path SH2, a switchback path SH4 for performing so-called switchback by reversing the transport direction of the recording sheet S is disposed below the cooling device Co. A switchback roller Rb as an example of a transport member that is rotatable in forward and reverse directions is disposed in the switchback path SH4. A third gate GT3 as an example of a transport-direction switching member is disposed at an inlet of the switchback path SH4.

The transport path SH at the downstream side of the switchback path SH4 merges with the transport path SH for each of the feed trays TR1 and TR2.

In the interface module U4, the transport path SH extends toward the output unit U3.

In the output unit U3, a stacker tray TRh as an example of a container on which output recording sheets S are stacked is disposed, and an output path SH5 diverging from the transport path SH extends toward the stacker tray TRh. The transport path SH in the first exemplary embodiment is configured such that, when an additional output unit (not shown) or an additional post-processing unit (not shown) is attached to the right side of the output unit U3, the transport path SH is capable of transporting the recording sheet S to the added unit.

Operation of Marking Unit

When the printer U receives image information transmitted from the personal computer PC via the print image server COM, the printer U commences a job, which is an image forming operation. When the job commences, the photoconductor drums Py to Po, the intermediate transfer belt B, and the like rotate.

The photoconductor drums Py to Po are rotationally driven by a drive source (not shown).

The chargers CCy to CCo receive a predetermined voltage so as to charge the surfaces of the photoconductor drums Py to Po.

The exposure units ROSy to ROSo output laser beams Ly, Lm, Lc, Lk, and Lo as an example of latent-image write-in light in accordance with a control signal from the controller C1 so as to write electrostatic latent images onto the charged surfaces of the photoconductor drums Py to Po.

The developing units Gy to Go develop the electrostatic latent images on the surfaces of the photoconductor drums Py to Po into visible images.

The toner cartridges Ky to Ko supply the developers as the developers are consumed in the developing process performed in the developing units Gy to Go.

The first-transfer rollers T1y to T1o receive a first-transfer voltage with a reversed polarity relative to the charge polarity of the developers so as to transfer the visible images on the surfaces of the photoconductor drums Py to Po onto the surface of the intermediate transfer belt B.

The photoconductor cleaners CLy to CLo clean the surfaces of the photoconductor drums Py to Po after the first-transfer process by removing residual developers therefrom.

When the intermediate transfer belt B passes through first-transfer regions facing the photoconductor drums Py to Po, O, Y, M, C, and K images are transferred and superposed on the intermediate transfer belt B in that order, and the intermediate transfer belt B subsequently travels through a second-transfer region facing the second-transfer unit T2. When a monochrome image is to be formed, an image of a single color is transferred onto the intermediate transfer belt B and is transported to the second-transfer region.

In accordance with the size of the received image information, the designated type of recording sheets S, and the sizes and types of accommodated recording sheets S, one of the pickup rollers Rp feeds recording sheets S from the corresponding one of the feed trays TR1 to TR4 from which the recording sheets S are to be fed.

The corresponding separating roller Rs separates the recording sheets S fed by the pickup roller Rp in a one-by-one fashion.

The deburring unit Bt deburrs each recording sheet S passing therethrough by applying a predetermined pressure thereto.

The multi-feed detector Jk detects the thickness of recording sheet or sheets S passing therethrough so as to detect whether or not multiple sheets S are fed.

The correcting rollers Rc correct a skew of each recording sheet S passing therethrough by bringing the recording sheet S into contact with a wall surface (not shown).

The registration roller Rr feeds the recording sheet S in accordance with a timing at which the image on the surface of the intermediate transfer belt B is transported to the second-transfer region.

In the second-transfer unit T2, a predetermined second-transfer voltage having the same polarity as the charge polarity of the developers is applied to the backup roller T2a via the contact roller T2c so that the image on the intermediate transfer belt B is transferred onto the recording sheet S.

The belt cleaner CLB cleans the surface of the intermediate transfer belt B after the image transfer process performed at the second-transfer region by removing residual developers therefrom.

After the image is transferred onto the recording sheet S by the second-transfer unit T2, the transport belts T2e and HB transport the recording sheet S downstream while supporting the recording sheet S on the surfaces thereof.

The fixing device F includes a heating roller Fh as an example of a heating member and a pressing roller Fp as an example of a pressing member. The heating roller Fh accommodates therein a heater as an example of a heat source. The fixing device F heats and presses the recording sheet S passing through a region where the heating roller Fh and the pressing roller Fp are in contact with each other so as to fix an unfixed image onto the surface of the recording sheet S.

The cooling device Co cools the recording sheet S heated by the fixing device F.

The decurler Hd applies pressure to the recording sheet S having passed through the cooling device Co so as to decurl the recording sheet S, that is, to remove bending therefrom.

The image reading device Sc reads the image from the surface of the recording sheet S having passed through the decurler Hd.

In the case of duplex printing, the recording sheet S having passed through the decurler Hd is transported to the inversion path SH2 due to activation of the first gate GT1 and is switched back in the switchback path SH4 so as to be transported again to the registration roller Rr via the transport path SH, whereby printing is performed on the second face of the recording sheet S.

The recording sheet S to be output to the stacker tray TRh as an example of an output section is transported along the transport path SH so as to be output onto the stacker tray TRh. In this case, if the recording sheet S to be output to the stacker tray TRh is in an inverted state, the recording sheet S is temporarily transported to the inversion path SH2 from the transport path SH. After the trailing edge of the recording sheet S in the transport direction thereof passes through the second gate GT2, the second gate GT2 is switched and the switchback rollers Rb are rotated in the reverse direction so that the recording sheet S is transported along the connection path SH3 toward the stacker tray TRh.

When multiple recording sheets S are stacked on the stacker tray TRh, a stacker plate TRh1 automatically moves upward or downward in accordance with the number of stacked recording sheets S so that the uppermost sheet is disposed at a predetermined height.

Image Reading Device According to First Exemplary Embodiment

Figure 3A:
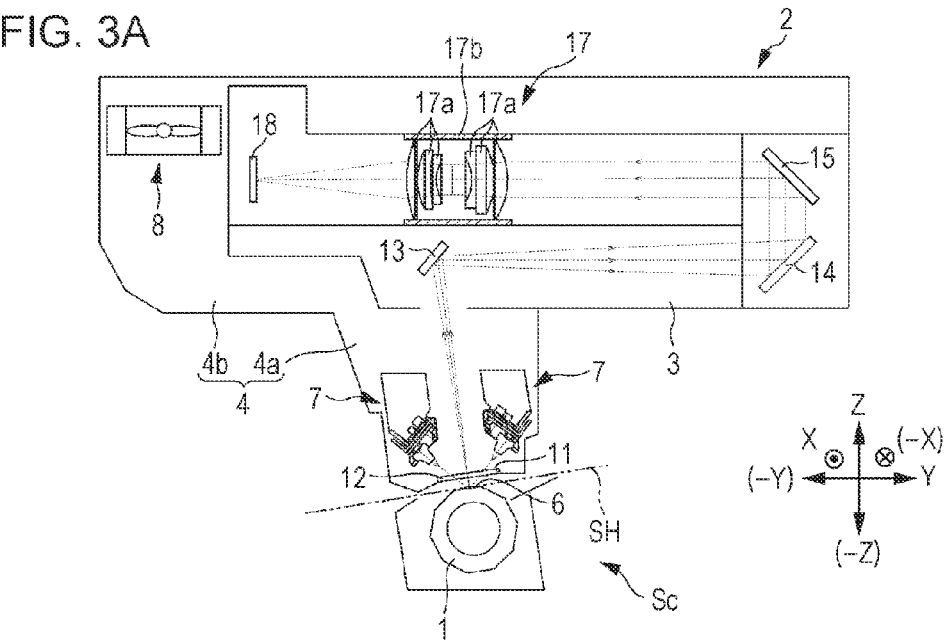
FIGS. 3A and 3B illustrate an image reading device according to the first exemplary embodiment, FIG. 3A being an enlarged view of a relevant part of the image reading device, FIG. 3B being an enlarged view of a relevant part of light source units.
Figure 3B:
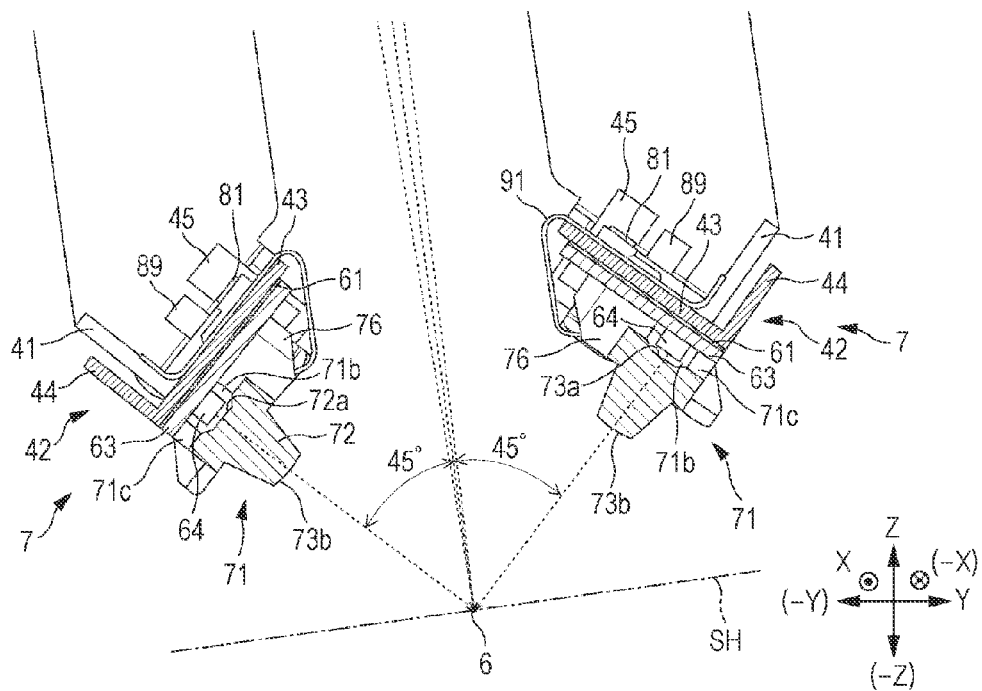

FIGS. 3A and 3B illustrate the image reading device according to the first exemplary embodiment. Specifically, FIG. 3A is an enlarged view of a relevant part of the image reading device, and FIG. 3B is an enlarged view of a relevant part of a read position.

Referring to FIGS. 3A and 3B, the image reading device Sc according to the first exemplary embodiment has a reference roller 1 as an example of a transport member that comes into contact with the lower surface of each recording sheet S transported along the transport path SH so as to transport the recording sheet S downstream. A body 2 of the image reading device Sc is disposed above the reference roller 1 with the transport path SH interposed therebetween. The body 2 includes a hollow-box-shaped optical-system accommodation section 3 located at an upper portion of the body 2 and extending in the transport direction and the widthwise direction of the recording sheet S, and a radiating-system accommodation section 4 disposed below and to the left of the optical-system accommodation section 3.

Lamps 7 as an example of light source units extending in the front-rear direction, which is the widthwise direction of the recording sheet S, are disposed in the radiating-system accommodation section 4. In the first exemplary embodiment, two lamps 7 are provided, each of which is disposed at a position that forms a 45° angle with the direction of the normal to the surface of the recording sheet S relative to a predetermined read position 6 on the transport path. The lamps 7 according to the first exemplary embodiment are formed of, but not limited to, white light emitting diodes (LEDs). Alternatively, light source units that output light having a continuous intensity in the wavelength band of visible light may be used. For example, tungsten lamps may be used.

Furthermore, a fan 8 as an example of a cooling member for cooling the lamps 7 is supported in the radiating-system accommodation section 4.

Figure 4A:
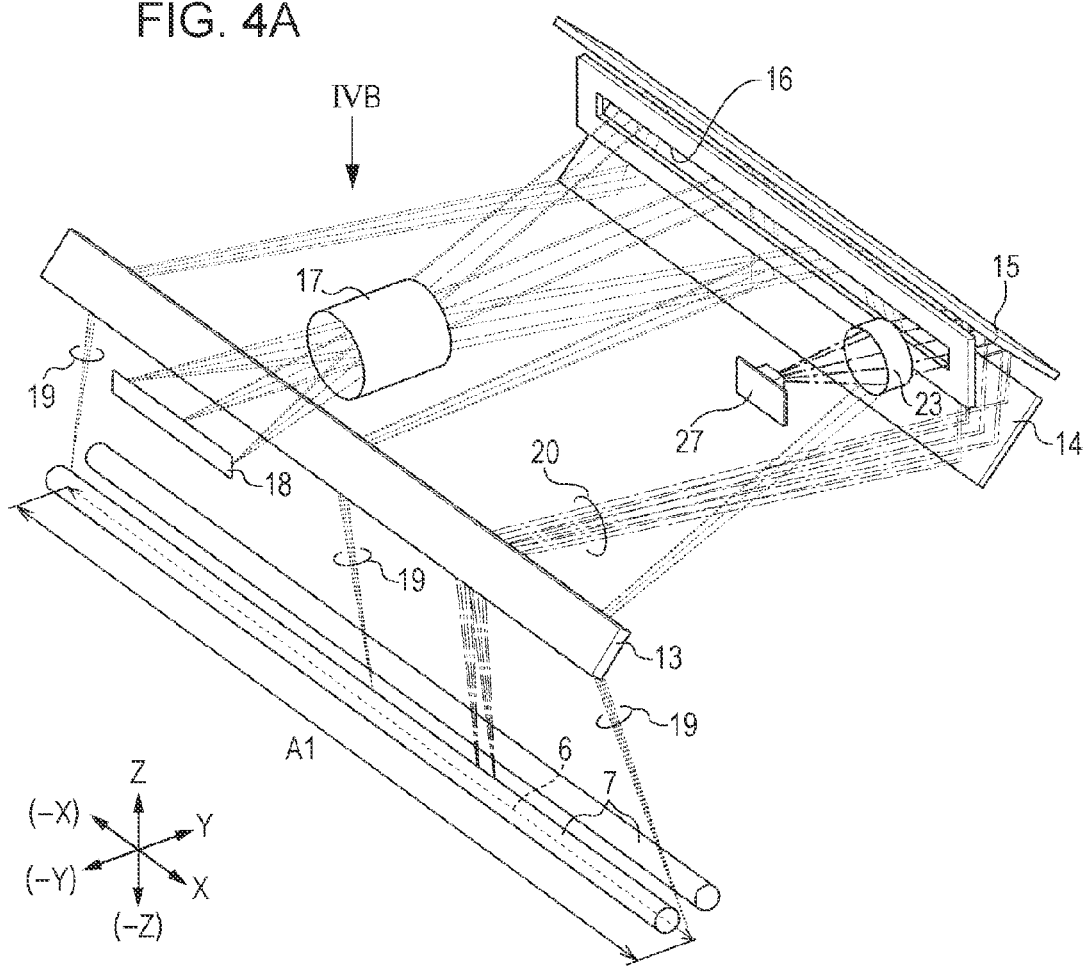
FIGS. 4A and 4B illustrate a first reader system and a second reader system in the image reading device according to the first exemplary embodiment, FIG. 4A illustrating a relevant part thereof, FIG. 4B being a diagram as viewed in a direction indicated by an arrow IVB in FIG. 4A.
Figure 4B:
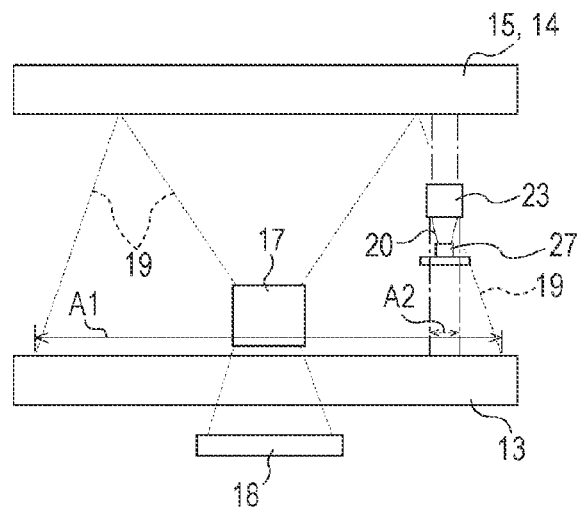

FIGS. 4A and 4B illustrate a first reader system and a second reader system in the image reading device according to the first exemplary embodiment. Specifically, FIG. 4A illustrates a relevant part of the systems, and FIG. 4B is a diagram as viewed in a direction indicated by an arrow IVB in FIG. 4A. FIG. 5 illustrates the second reader system in the image reading device according to the first exemplary embodiment.

Referring to FIGS. 3A to 5, the radiating-system accommodation section 4 is provided with an opening 11 located above the read position 6 and extending in the front-rear direction. The opening 11 supports a transparent window member 12 that is capable of transmitting therethrough reflection light from the recording sheet S.

In the optical-system accommodation section 3, a first plate-shaped mirror 13 as an example of a first optical member that extends in the front-rear direction and reflects the light from the read position 6 rightward is supported above the window member 12. A second plate-shaped mirror 14 as an example of a second optical member that extends in the front-rear direction and reflects the light from the first mirror 13 upward is supported at the right side of the first mirror 13. A third plate-shaped mirror 15 as an example of a third optical member that extends in the front-rear direction and reflects the light from the second mirror 14 leftward is supported above the second mirror 14. The mirrors 13, 14, and 15 constitute an optical system 13+14+15 according to the first exemplary embodiment.

Referring to FIGS. 3A to 4B, a first imaging unit 17 as an example of a first imaging system that is disposed to the left of the third mirror 15 and that is located in a central area in the front-rear direction is supported via a window-like opening 16 that blocks ambient light, diffused reflection light, and the like. The first imaging unit 17 has a first imaging lens 17a as an example of a first imaging member that focuses the light from the third mirror 15 so as to form an image thereof. The first imaging lens 17a is accommodated inside a hood 17b as an example of a light blocking member that reduces the quantity of ambient light entering the first imaging lens 17a.

An image capturing element 18 as an example of a first reader member that receives light so as to read an image of the read position 6 is disposed at the left side of the first imaging unit 17. Although a known charge-coupled device (CCD) image sensor having R, G, and B color filters is used as the image capturing element 18 in the first exemplary embodiment, a freely-chosen image capturing member that is capable of capturing an image used for detecting an image position, discoloration, an image defect, or the like may be used as an alternative.

At positions where the mirrors 13 to 15 according to the first exemplary embodiment are disposed, the light is not collimated. The first imaging lens 17a focuses light 19 that has reached the first imaging lens 17a from the third mirror 15 onto the image capturing element 18 so as to project an area A1 of the read position 6 onto the image capturing element 18. Accordingly, the image capturing element 18 according to the first exemplary embodiment is configured to read an image of a predetermined first read area A1 as an example of a read area, which is substantially the entire widthwise area of the recording sheet S passing through the read position 6.

Figure 6A:
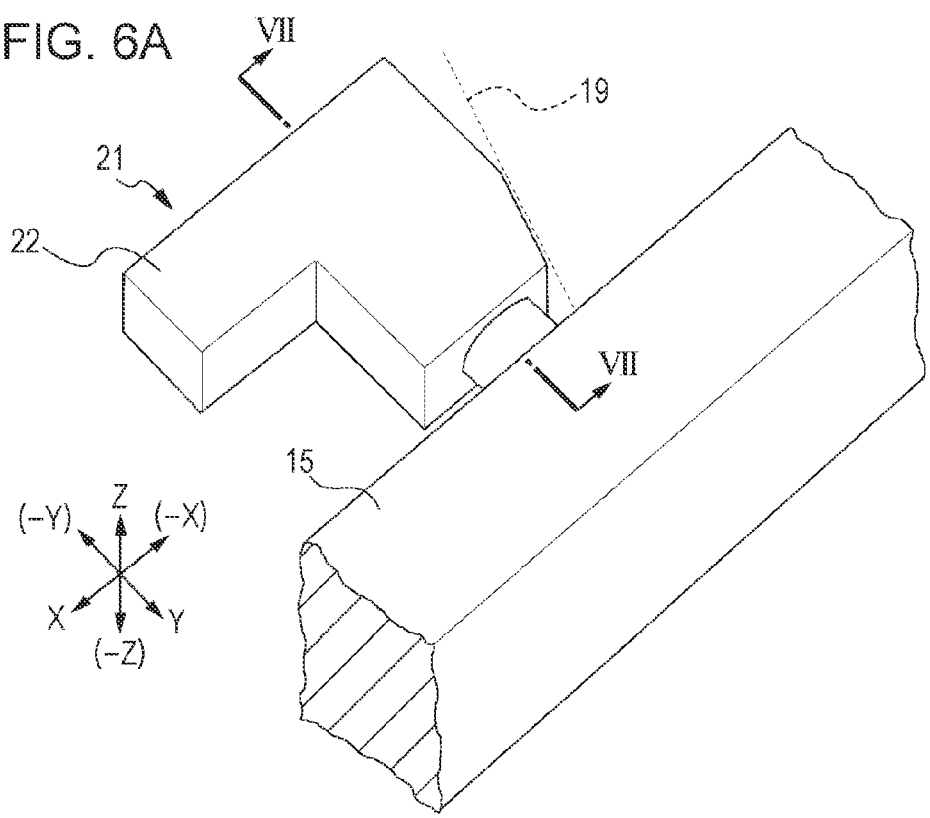
FIGS. 6A and 6B illustrate a relevant part of a second reader member according to the first exemplary embodiment, FIG. 6A being an external view thereof, FIG. 6B being a partial cross-sectional view thereof.
Figure 6B:
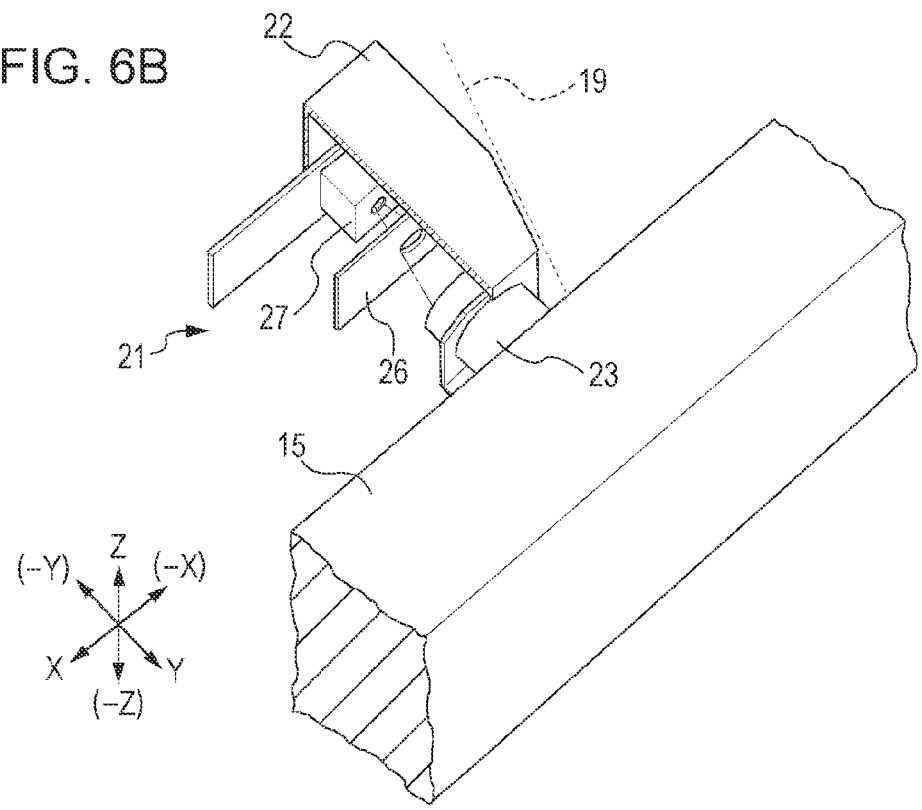

FIGS. 6A and 6B illustrate a relevant part of a second reader member according to the first exemplary embodiment. Specifically, FIG. 6A is an external view of the second reader member, and FIG. 6B is a partial cross-sectional view thereof.

Figure 7:
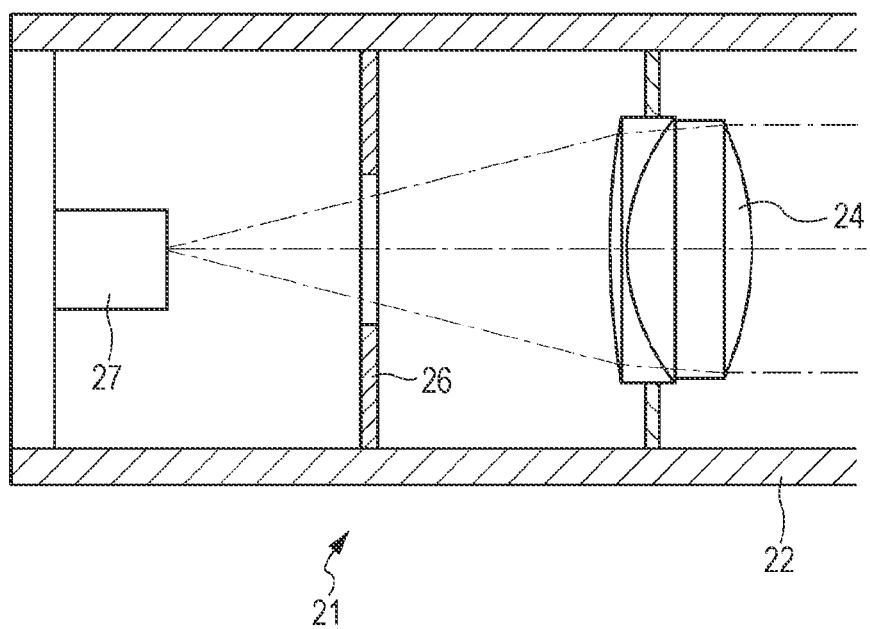
FIG. 7 is a cross-sectional view taken along line VII-VII in FIG. 6A.

FIG. 7 is a cross-sectional view taken along line VII-VII in FIG. 6A.

Referring to FIGS. 3A and 3B and FIGS. 5 to 7, a color measurement unit 21 as an example of a second reader system is disposed to the left of the third mirror 15 as well as at the right and front sides of the first imaging lens 17a.

Referring to FIGS. 5 to 7, the color measurement unit 21 has a cover 22 as an example of a light blocking member. Referring to FIGS. 6A and 6B, the cover 22 is disposed at a position outside an optical path of the light 19 entering the first imaging lens 17a. Moreover, the cover 22 has a certain shape and is disposed at a certain position such that the cover 22 does not adversely affect the image captured by the image capturing element 18. Specifically, as shown in FIG. 4B, the color measurement unit 21 according to the first exemplary embodiment is disposed outside the optical path of the light 19 read by the image capturing element 18, and the length of an optical path of light 20 measured by the color measurement unit 21 is shorter than that of the light 19 read by the image capturing element 18. Furthermore, as shown in FIG. 4B, in the color measurement unit 21 according to the first exemplary embodiment, a color measurement sensor 27 is disposed inward of the first read area A1 and the third mirror 15 in the longitudinal direction thereof, that is, rearward of positions corresponding to front ends of the first read area A1 and the third mirror 15.

Referring to FIGS. 6A to 7, a hood 23 as an example of a light blocking member is supported within the cover 22, and a second imaging lens 24 as an example of a second imaging member that focuses the light from the third mirror 15 so as to form an image thereof is supported within the hood 23. An aperture 26 as an example of a light blocking member is supported at the left side of the second imaging lens 24, and the color measurement sensor 27 as an example of a second reader member is supported at the left side of the aperture 26. Therefore, the second imaging lens 24 and the color measurement sensor 27 are surrounded by the hood 23.

The color measurement sensor 27 according to the first exemplary embodiment includes therein a spectroscope (not shown) and a detector that detects spectral light, and reads the colors in the image of the read position 6. Various known types of color-measuring devices and colorimeters may be used as the color measurement sensor 27. Specifically, known color-measuring devices, such as a sensor that uses a spectro-component, such as a grating or a prism, to separate the light and measure the colors thereof, or a sensor that uses a bandpass filter to separate a visible wavelength band into about six to eight bands so as to measure the colors thereof, may be used. In other words, the color measurement sensor 27 according to the first exemplary embodiment may be a high-performance color-measuring device specialized for color measurement and having higher wavelength-resolution and color-separation capabilities and higher color measurement accuracy, as compared with a known CCD sensor having a color separation filter for three colors, i.e., RGB.

Referring to FIG. 5, assuming that the distance from a widthwise center A1a of the recording sheet S to an outer widthwise end A1b is defined as 100%, the color measurement sensor 27 according to the first exemplary embodiment reads an image of a predetermined second read area A2 included in the first read area A1 and located inward of a position corresponding to 70% or smaller, that is, a 70%-position A1c. Therefore, in the first exemplary embodiment, the longitudinal direction of the first read area A1 to be read by the image capturing element 18 and the longitudinal direction of the second read area A2 are aligned with each other.

Referring to FIG. 3B, an optical axis of the color measurement sensor 27 according to the first exemplary embodiment is set within 10° relative to the normal to the measurement surface of the recording sheet S. Because an incident angle of light radiated onto the recording sheet S is substantially set to 45°, a regularly reflected component from the radiated light may be prevented from entering the color measurement sensor 27 by setting the tilt angle of the optical axis of the color measurement sensor 27 within 10°, thereby improving the color measurement accuracy.

Characteristics of Image Capturing Element and Color Measurement Sensor

Figure 8A:
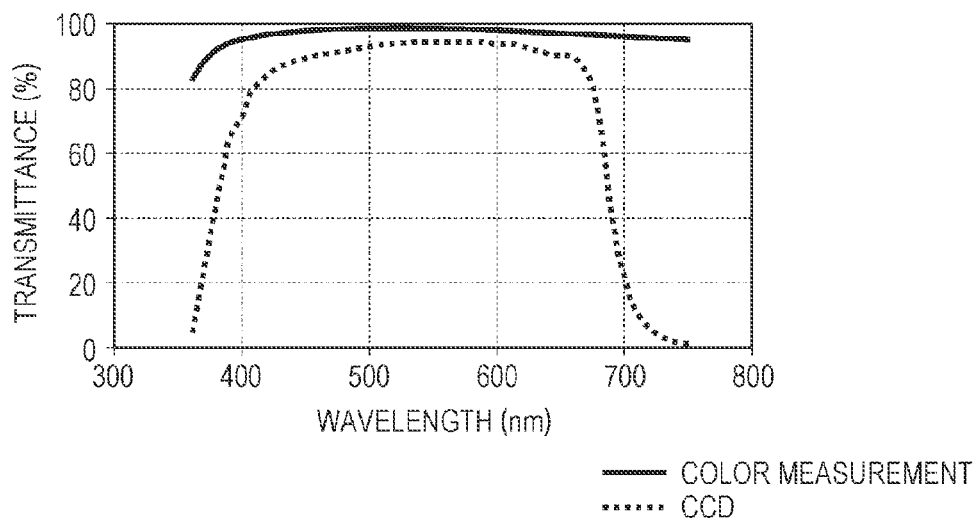
FIGS. 8A and 8B illustrate the characteristics of the two reader members used in the first exemplary embodiment, FIG. 8A being a spectral characteristic graph in which the horizontal axis denotes wavelength and the vertical axis denotes transmittance, FIG. 8B being an optical-system resolution graph in which the horizontal axis denotes spatial frequency and the vertical axis denotes modulation transfer function (MTF)
Figure 8B:
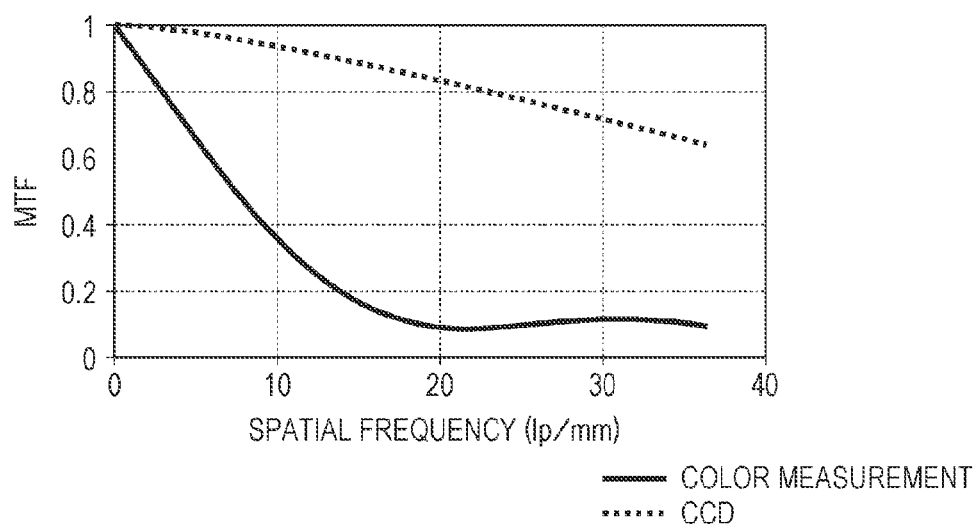

FIGS. 8A and 8B illustrate the characteristics of the two reader members used in the first exemplary embodiment. Specifically, FIG. 8A is a spectral characteristic graph in which the horizontal axis denotes wavelength and the vertical axis denotes transmittance, and FIG. 8B is an optical-system resolution graph in which the horizontal axis denotes spatial frequency and the vertical axis denotes modulation transfer function (MTF).

In FIGS. 8A and 8B, a dashed line denotes the characteristic of an image-capturing optical system 12+13+14+15+17+18, and a solid line denotes the characteristic of a color-measurement optical system 12+13+14+15+24+27. As shown in FIGS. 8A and 8B, the color-measurement optical system 12+13+14+15+24+27 has high transmittance over a wide wavelength band as compared with the image-capturing optical system 12+13+14+15+17+18, and tends to have a low demand with respect to MTF. In other words, the color-measurement optical system 12+13+14+15+24+27 has a high capability for color measurement, namely, for wavelength measurement of light, whereas the image-capturing optical system 12+13+14+15+17+18 has a low demand with respect to spectral transmittance but has high resolution so as to be capable of measuring an image position and the like with high accuracy.

Read Chart

Figure 9:
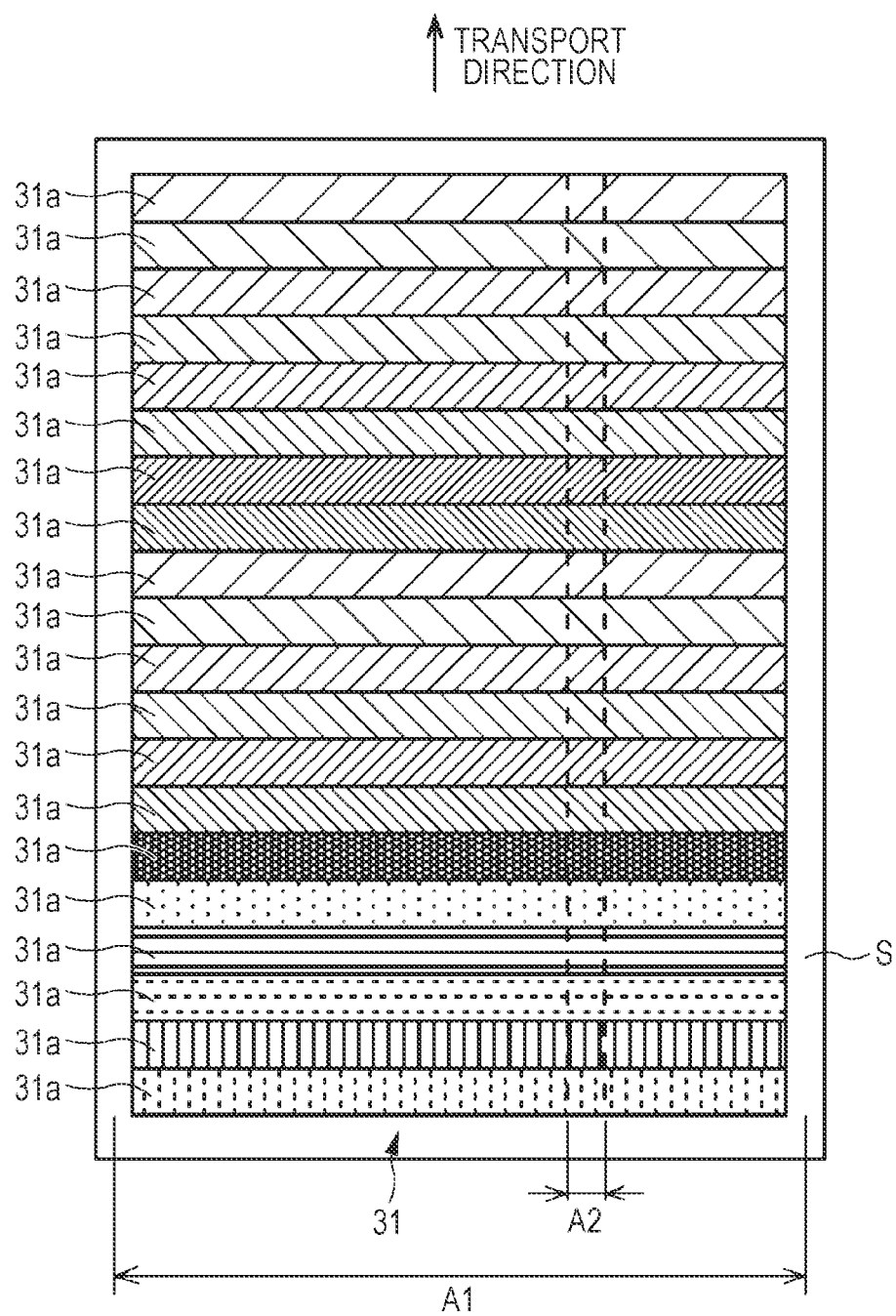
FIG. 9 illustrates a chart image used for adjustment in the image forming apparatus according to the first exemplary embodiment.

FIG. 9 illustrates a chart used for adjustment in the image forming apparatus according to the first exemplary embodiment.

Referring to FIG. 9, a read chart 31 as an example of an image read by the image reading device Sc according to the first exemplary embodiment has multiple strip-shaped areas 31a extending in the widthwise direction of the recording sheet S and arranged in the transport direction. The strip-shaped areas 31a are formed as an example of predetermined color-measurement images with different colors and densities. In the first exemplary embodiment, in a case where a predetermined adjustment process commences when an input is received via the operable unit UI or a predetermined number of sheets are to be printed, the marking unit U1a is set to form the read chart 31 on the recording sheet S, and the read chart 31 is simultaneously read by the image capturing element 18 and the color measurement sensor 27. Specifically, in the first exemplary embodiment, the read chart 31 functions as a first image for image-quality determination to be read by the image capturing element 18 as well as a second image for color determination to be read by the color measurement sensor 27.

Operation of Image Reading Device According to First Exemplary Embodiment

In the image reading device Sc according to the first exemplary embodiment having the above-described configuration, when the adjustment process commences, the marking unit U1a generates the read chart 31, and the read chart 31 is transferred and fixed onto a recording sheet S. After the recording sheet S is cooled, the recording sheet S passes through the read position 6. When passing through the read position 6, light radiated from the lamps 7 is reflected by the read chart 31 and is measured by the image capturing element 18 and the color measurement sensor 27 via the optical system 13+14+15+17+24.

Based on the image measured by the image capturing element 18, the controller C1 determines whether there is misregistration in the image on the surface of the recording sheet S, discoloration in the widthwise direction, or an image defect such as a white spot or streak. Then, in a subsequent printing process and onward, the controller C1 performs processes, such as adjusting the rotational speed of the photoconductor drums Py to Po and the transport speed of the recording sheet S in accordance with the misregistration, adjusting the output from the exposure units ROSy to ROSo in the widthwise direction in accordance with the discoloration, and displaying a message prompting the user to check or replace the components in accordance with the image detect. Furthermore, based on the measurement result of the color measurement sensor 27, the controller C1 determines whether there is color misregistration between the colors in the printed image and the measured colors. Based on the color misregistration, the controller C1 performs a color adjustment process by adjusting the output from the exposure units ROSy to ROSo between the respective colors and the voltages applied to the chargers CCy to CCo and the developing units Gy to Go.

Therefore, in the image reading device Sc according to the first exemplary embodiment, the image capturing element 18 and the color measurement sensor 27 are capable of performing two different kinds of reading processes, i.e., an image capturing process and a color measurement process, with respect to an image by sharing the optical system 13+14+15, thereby allowing for a compact configuration, as compared with a configuration provided with an additional optical system.

In particular, in the first exemplary embodiment, since the lamps 7 serving as light source units are shared between the image capturing process and the color measurement process, size reduction and energy efficiency may both be achieved.

Furthermore, in the first exemplary embodiment, since the first read area A1 to be measured by the image capturing element 18 and the second read area A2 to be measured by the color measurement sensor 27 share the same longitudinal direction, the read area of the recording sheet S in the moving direction thereof may be reduced, as compared with a case where the two areas have different longitudinal directions. Accordingly, the lamps 7 and the mirrors 13 to 15 may be reduced in size, thereby achieving size reduction of the image reading device Sc. Moreover, at the outer longitudinal edges of the printer U, the image forming capability generally tends to become unstable as compared with the central area thereof, possibly resulting in reduced accuracy of the image characteristics to be measured. In contrast, in the first exemplary embodiment, the second read area A2 is disposed inward of the 70%-position in the X-axis direction of the recording sheet S, so that the color measurement accuracy may be improved, as compared with a case where the second read area A2 is disposed toward an outer edge.

Furthermore, in the first exemplary embodiment, the second imaging lens 24 of the color measurement sensor 27 is provided separately from the first imaging lens 17a used by the image capturing element 18, so that the color measurement sensor 27 and the image capturing element 18 may be positionally displaced relative to each other. Consequently, the degree of freedom in terms of design is improved.

In particular, the color measurement sensor 27 is disposed closer toward the third mirror 15 relative to the image capturing element 18, and has a short optical path for the light 20. In general, if a certain light quantity is to be ensured as the optical path increases in length, a lens with a large aperture is used, possibly resulting in an increase in size of the second imaging lens 24. In contrast, in the first exemplary embodiment, the optical path of the light 20 entering the color measurement sensor 27 is short so that an increase in size of the second imaging lens 24 may be suppressed, thereby achieving size reduction and cost reduction.

Furthermore, in the first exemplary embodiment, the tilt angle of the second imaging lens 24 relative to the normal to the surface of the recording sheet S is set within 10° so that regularly reflected light from the lamps 7 may be prevented from entering the second imaging lens 24, thereby allowing for highly accurate color measurement.

Furthermore, in the first exemplary embodiment, the read chart 31 printed on the recording sheet S by the marking unit U1a is read by the image capturing element 18 and the color measurement sensor 27. Specifically, unlike a case where the colors, discoloration, and the like are determined by capturing visible images developed on the surfaces of the photoconductor drums Py to Po or visible images transferred onto the surface of the intermediate transfer belt B, an image printed on the recording sheet S that is to be actually viewed by the user is read in the first exemplary embodiment. Therefore, the measurement process is performed on the basis of an image that is closer to reality, as compared with the case where the images on the surfaces of the photoconductor drums Py to Po and the like are read, thereby reducing a difference between the corrected result and the printed result.

Furthermore, in the first exemplary embodiment, the image quality, such as an image position, discoloration in the widthwise direction, and an image defect, and the colors can be simultaneously measured and determined based on a single read chart 31. Thus, the measurement and adjustment processes may be performed within a shorter period of time, as compared with a case where the image quality and the colors are individually measured, thereby allowing for an increase in overall speed.

Furthermore, in the first exemplary embodiment, the light blocking members 17b, 22, 23, and 26 are disposed such that an adverse effect of ambient light on the imaging lens 17a and 24 may be reduced. In particular, the color measurement sensor 27 is surrounded by the hood 23 so that a reduction in the color measurement accuracy may be suppressed.

Light Source Units

Next, the lamps 7 serving as an example of light source units in the image reading device Sc according to the first exemplary embodiment will be described. Although two lamps 7 are provided as light source units in the first exemplary embodiment, since the lamps 7 are simply disposed in a symmetric arrangement and have the same configuration, the following description will only be directed to the lamp 7 at the left side, and a description of the lamp 7 at the right side will be omitted.

Referring to FIG. 3B, the lamp 7 according to the first exemplary embodiment is supported by the body U1 via a stationary plate 41 as an example of a light-source-unit supporter.

Figure 10:
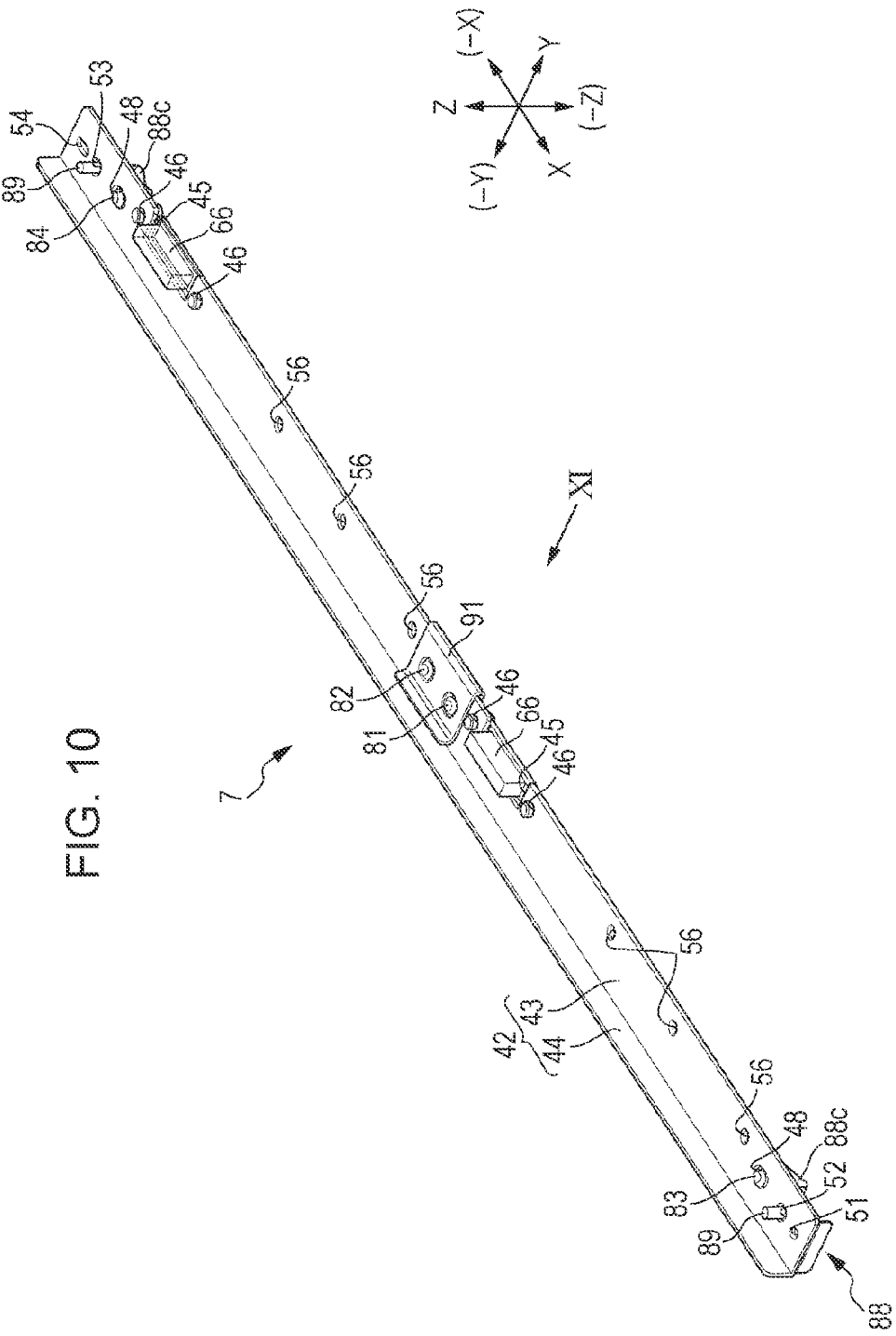
FIG. 10 is a perspective view of one of the light source units according to the first exemplary embodiment.

FIG. 10 is a perspective view of the lamp 7 according to the first exemplary embodiment.

Figure 11:
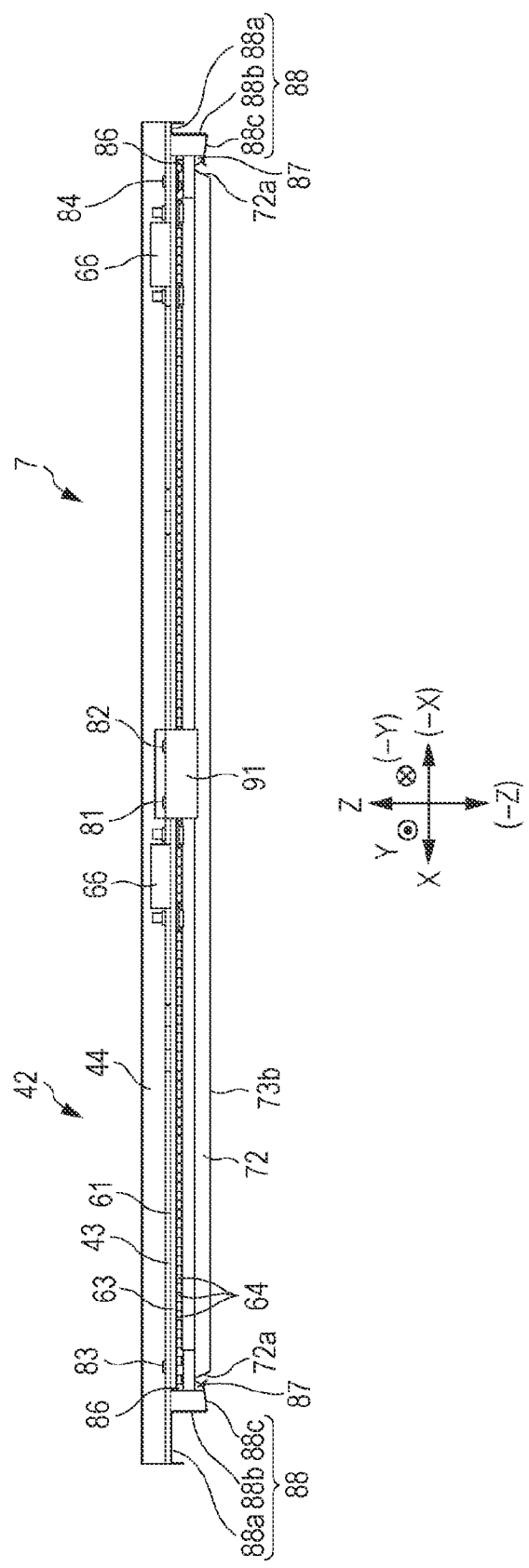
FIG. 11 illustrates the light source unit according to the first exemplary embodiment, as viewed in a direction indicated by an arrow XI in FIG. 10.

FIG. 11 illustrates the lamp 7 according to the first exemplary embodiment, as viewed in a direction indicated by an arrow XI in FIG. 10.

Figure 12:
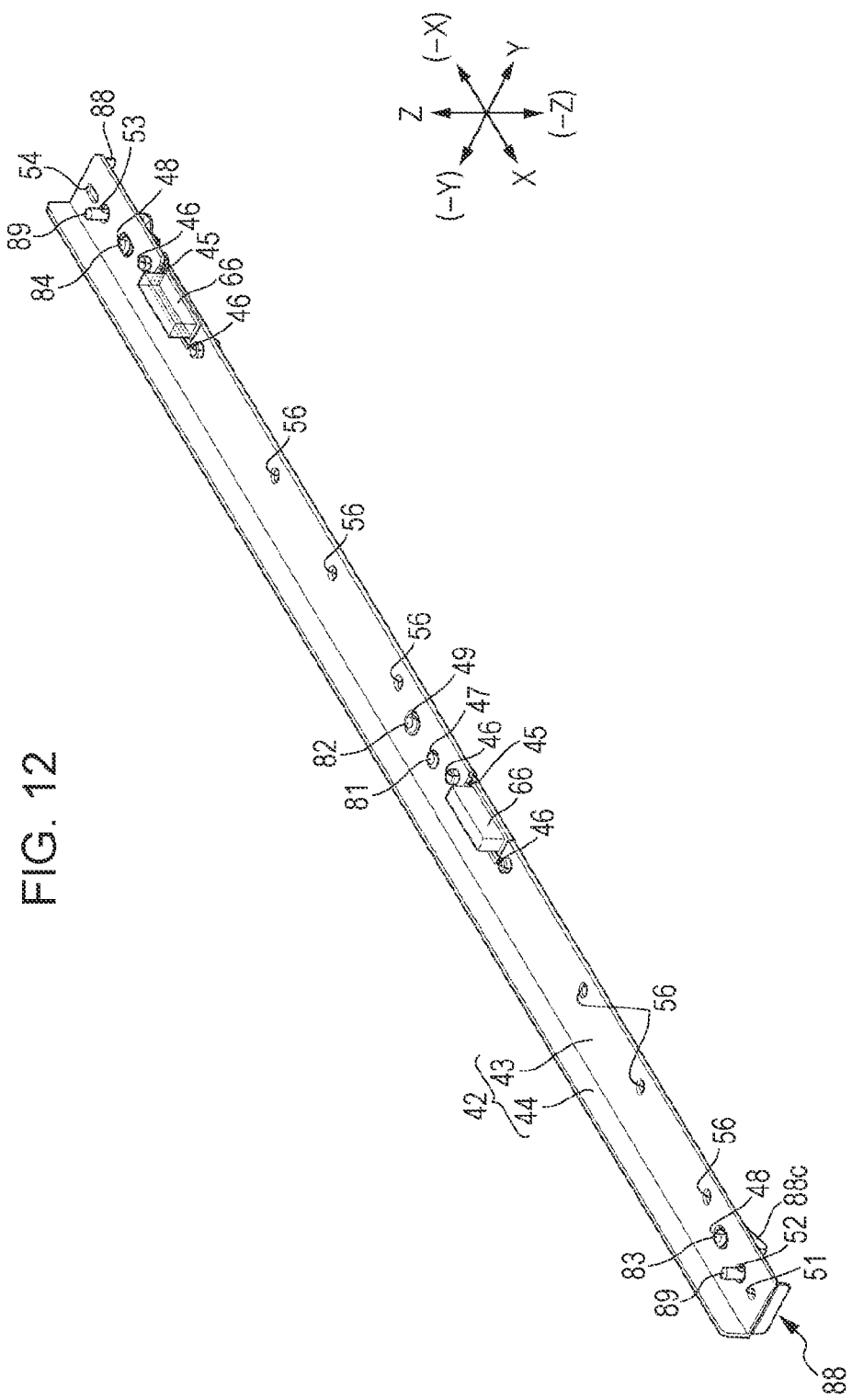
FIG. 12 illustrates a state where a clip as an example of a retaining member is removed from the state shown in FIG. 10.

FIG. 12 illustrates a state where a clip as an example of a retaining member is removed from the state shown in FIG. 10.

With regard to an XYZ coordinate system in FIGS. 10 to 20C, for illustrative purposes, the X-axis direction will be aligned with the X-axis direction in FIGS. 1 to 9, but the Z-axis direction will be aligned with the optical axis, and the Y-axis direction will be described as a direction orthogonal to the X-axis direction and the Z-axis direction. In other words, in FIGS. 10 to 20C, the Y-axis direction and the Z-axis direction are not aligned with those shown in FIGS. 1 to 9.

Referring to FIG. 3B and FIGS. 10 to 12, the lamp 7 according to the first exemplary embodiment has a metal plate 42 as an example of a support member. Although the metal plate 42 according to the first exemplary embodiment is composed of steel as an example of metal, the material used therefor is not limited to steel but may be changed depending on design, specifications, and the like. The metal plate 42 includes a flat plate portion 43 extending in the front-rear direction, i.e., the widthwise direction of the recording sheet S, and a reinforcement bent portion 44 extending upward from a left edge of the flat plate portion 43. Referring to FIGS. 11 and 12, the flat plate portion 43 is provided with cutout recesses 45 at a rear section and a section forward of the central area in the front-rear direction. The front and rear sides of each recess 45 are provided with screw holes 46 as an example of fastening sections.

Referring to FIG. 12, the central area of the flat plate portion 43 in the front-rear direction is provided with a circular hole 47 as an example of a first positioning section. Both ends of the flat plate portion 43 in the front-rear direction are provided with long holes 48 as an example of second positioning sections extending in the front-rear direction. Furthermore, a clearance hole 49 having a diameter larger than that of the circular hole 47 is formed as an example of a third positioning section at the rear side of the circular hole 47 in the flat plate portion 43.

Moreover, the flat plate portion 43 is provided with a front positioning hole 51 and a rear screw hole 52 as an example of retaining-member fixation sections at the front side of the front long hole 48. Furthermore, a front screw hole 53 and a rear long hole 54 extending in the front-rear direction are formed as an example of retaining-member fixation sections at the rear side of the rear long hole 48.

The flat plate portion 43 is also provided with multiple through-holes 56 arranged in the front-rear direction and through which screws as an example of fastening members (not shown) are inserted when the metal plate 42 is fixed onto the stationary plate 41.

Figure 13:
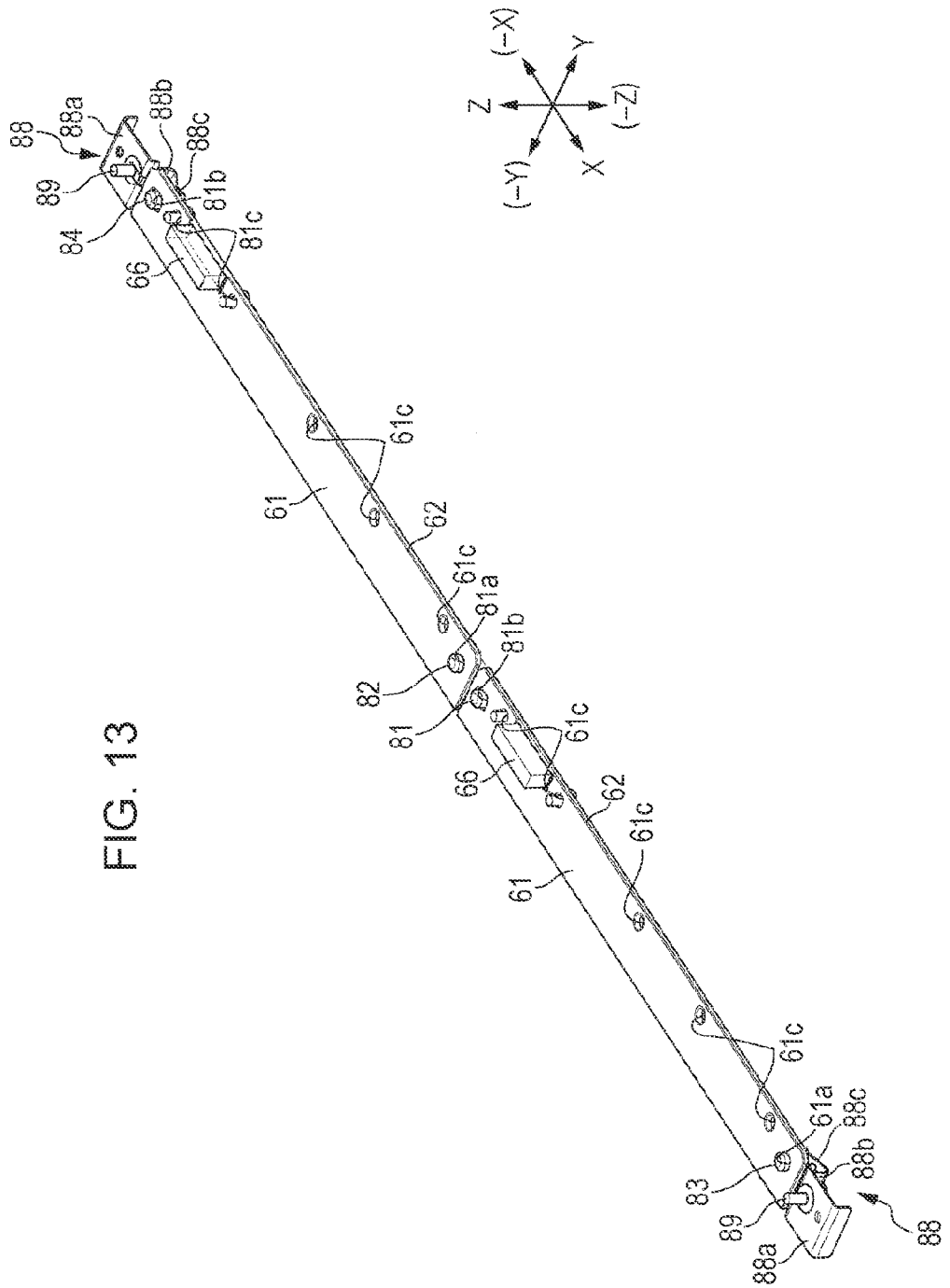
FIG. 13 illustrates a state where a metal plate as an example of a support member is removed from the state shown in FIG. 12.

FIG. 13 illustrates a state where the metal plate 42 as an example of a support member is removed from the state shown in FIG. 12.

Figure 14:
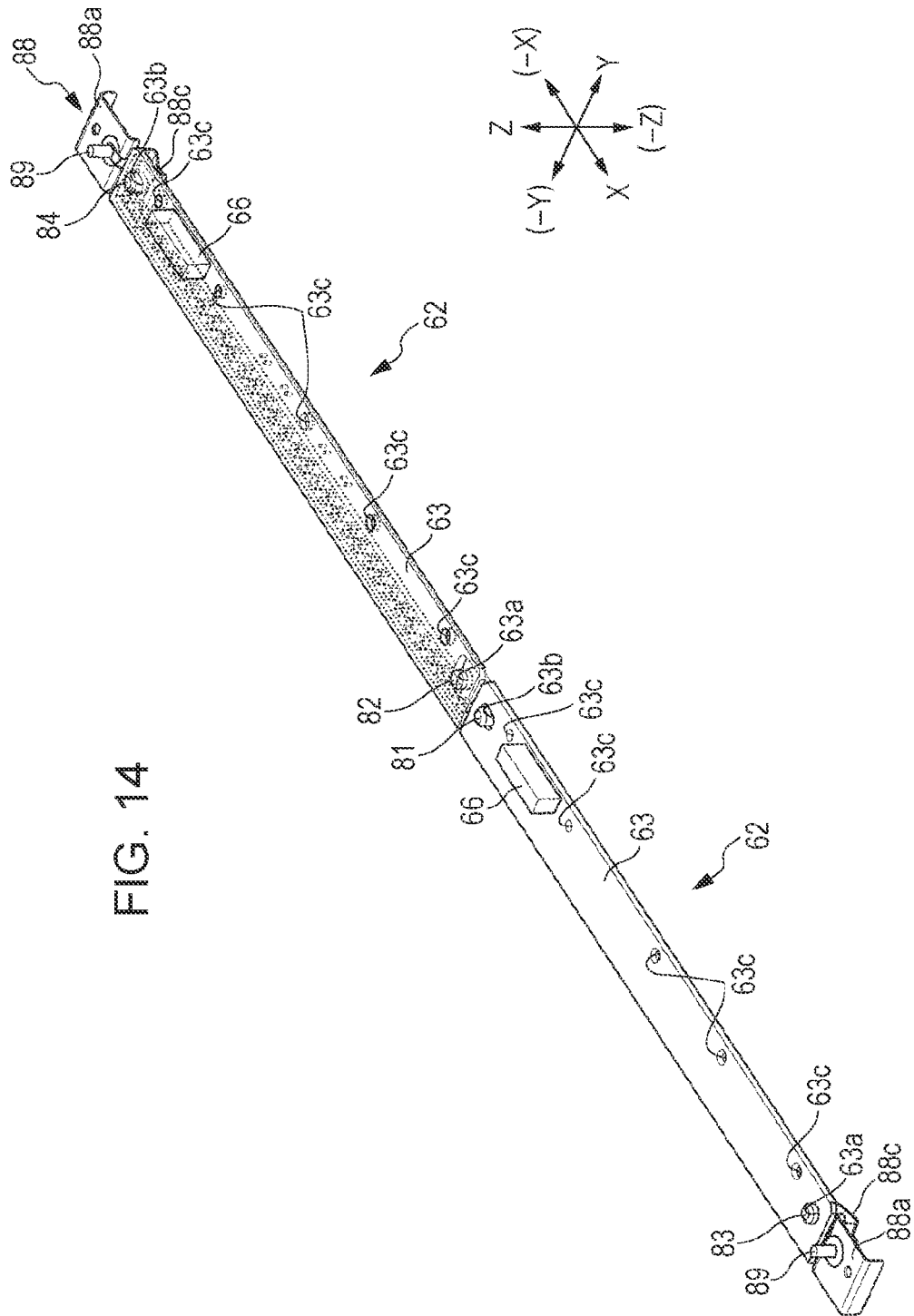
FIG. 14 illustrates a state where an insulator as an example of an insulation member is removed from the state shown in FIG. 13.

FIG. 14 illustrates a state where an insulator as an example of an insulation member is removed from the state shown in FIG. 13.

Referring to FIG. 3B and FIGS. 12 to 14, the lower surface of the flat plate portion 43 of the metal plate 42 supports light-emitting diode (LED) units 62 as an example of light source members with an insulator 61 as an example of an insulation member interposed between the lower surface and the LED units 62. The insulator 61 may be a known insulating tape as an example of a strip-shaped member having high insulation properties and high thermal conductivity. Examples of such an insulator 61 include Sarcon 15GTR manufactured by Fuji Polymer Industries Co., Ltd. and a one-sided adhesive tape.

Referring to FIGS. 3B, 13, and 14, the lamp 7 according to the first exemplary embodiment has a total of two front and rear LED units 62, and the LED units 62 have the same configuration. The LED units 62 according to the first exemplary embodiment each have a plate-shaped substrate 63 extending in the longitudinal direction, which is the front-rear direction. A front end of each substrate 63 according to the first exemplary embodiment is provided with a circular hole 63a as an example of a first positioning section for the corresponding light source member, and a rear end is provided with a long hole 63b extending in the front-rear direction and serving as an example of a second positioning section for the light source member.

Multiple LED chips 64 as an example of light source portions that release light are arranged at a predetermined pitch in the front-rear direction on the lower surface of each substrate 63. A rear section on the upper surface of each substrate 63 supports a connector 66 as an example of a terminal for supplying power to the LED chips 64 and for inputting and outputting a control signal. The metal plate 42 is provided with the recesses 45 in correspondence with the connectors 66 so that the LED units 62 are supported by the metal plate 42 without the connectors 66 interfering with the metal plate 42.

Furthermore, the substrates 63 according to the first exemplary embodiment are provided with through-holes 63c having an inner diameter larger than the outer diameter of screws and disposed at positions corresponding to the screw holes 46 and the through-holes 56. The insulator 61 is formed so as to cover the upper surfaces of the substrates 63 and has holes 61a, 61b, and 61c at positions corresponding to the holes 63a, 63b, and 63c.

Figure 15:
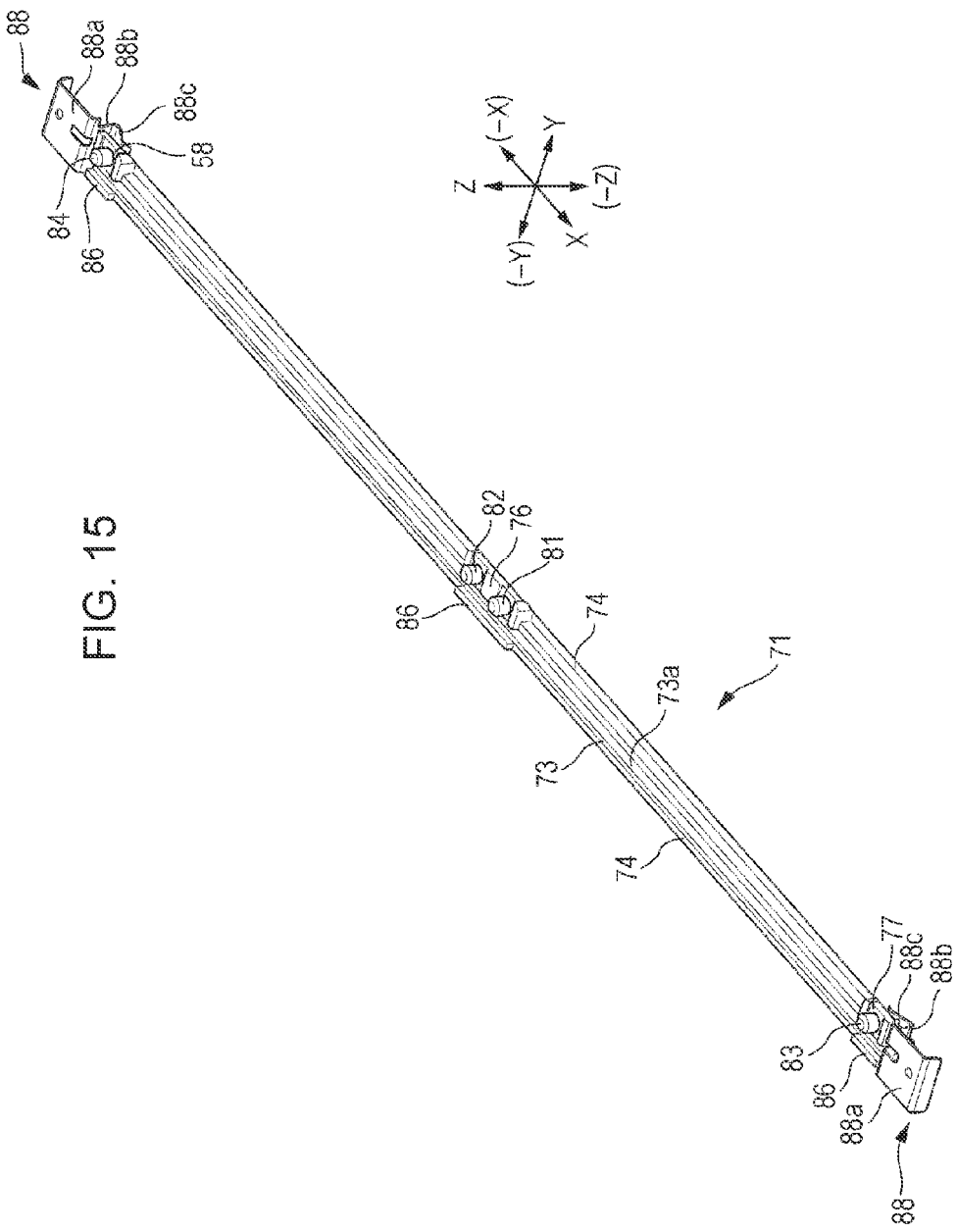
FIG. 15 illustrates a state where light-emitting diode (LED) units as an example of light source members are removed from the state shown in FIG. 14.

FIG. 15 illustrates a state where the LED units 62 as an example of light source members are removed from the state shown in FIG. 14.

Figure 16:
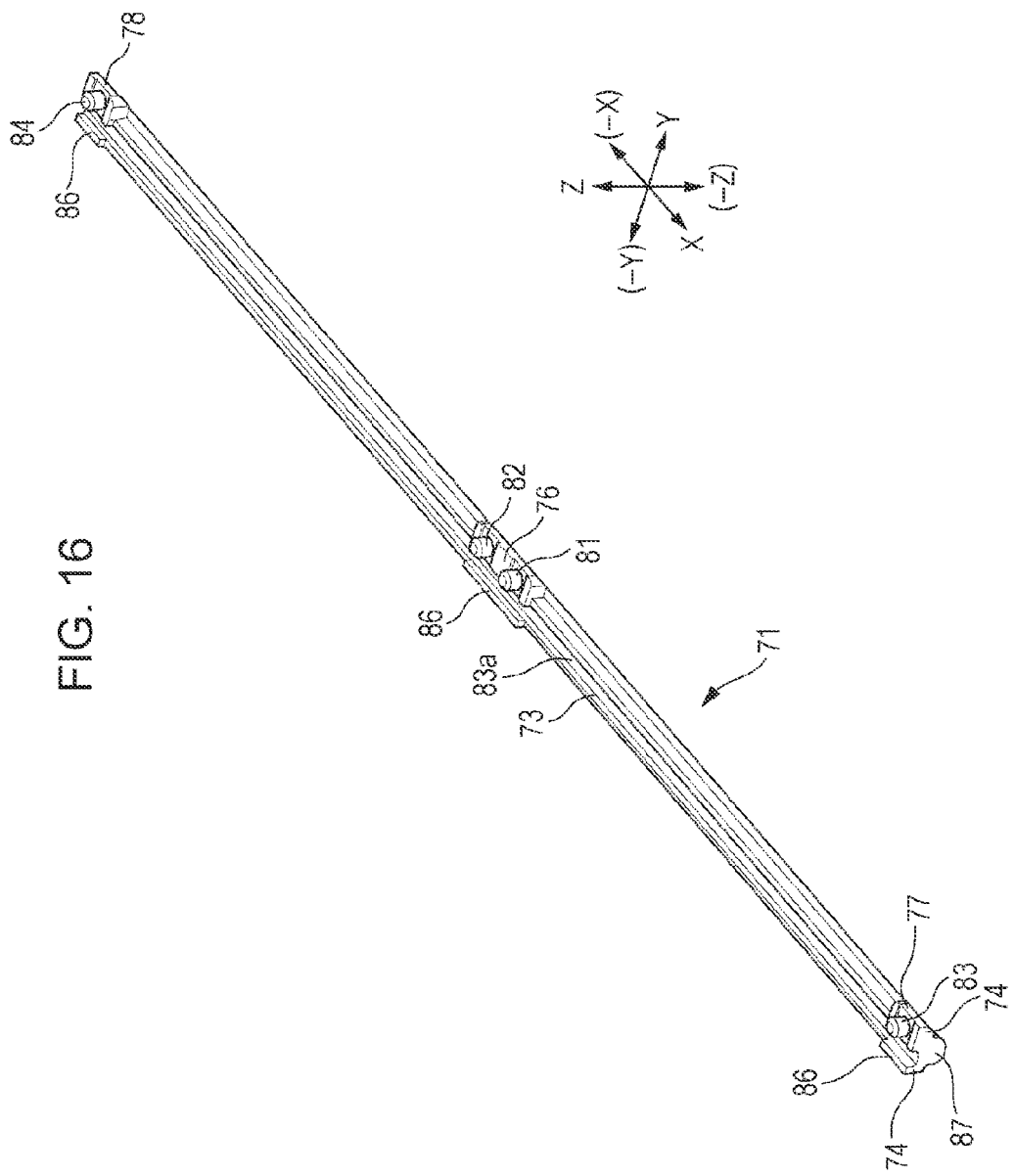
FIG. 16 illustrates a state where leaf springs as an example of retaining members are removed from the state shown in FIG. 15.

FIG. 16 illustrates a state where leaf springs as an example of retaining members are removed from the state shown in FIG. 15.

Figure 17:
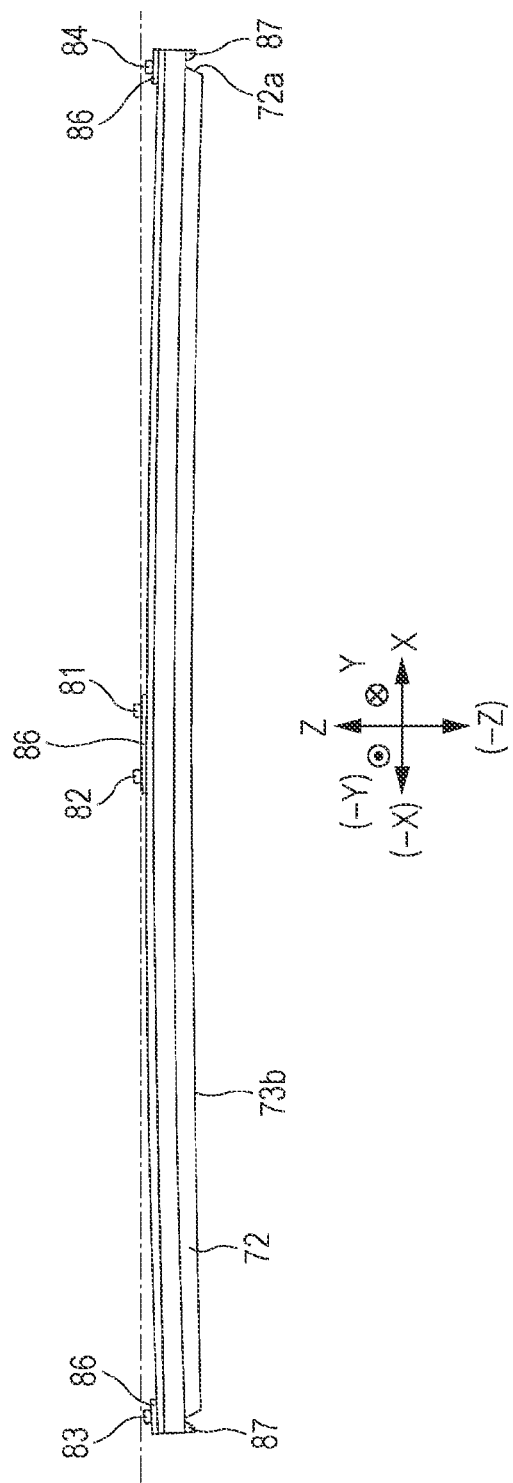
FIG. 17 illustrates a light guide member according to the first exemplary embodiment, and shows a state where an external force is not applied to the light guide member.

FIG. 17 illustrates a light guide member according to the first exemplary embodiment, and shows a state where an external force is not applied to the light guide member.

Referring to FIG. 3B and FIGS. 14 to 17, a light guide 71 as an example of a light guide member extending in the front-rear direction is supported below the LED units 62. The light guide 71 according to the first exemplary embodiment is composed of a transparent material through which light can be transmitted. For example, a transparent plastic material with lower rigidity than the metal plate 42 is used. Referring to FIG. 17, in a state where an external force is not applied to the light guide 71 according to the first exemplary embodiment, that is, in a state where the light guide 71 is not attached to the LED units 62, the metal plate 42, and the like, the light guide 71 has a shape such that one end thereof in the front-rear direction extends away from the metal plate 42 and the like relative to the other end thereof. In other words, the light guide 71 has a warped shape relative to the metal plate 42.

Figure 18:
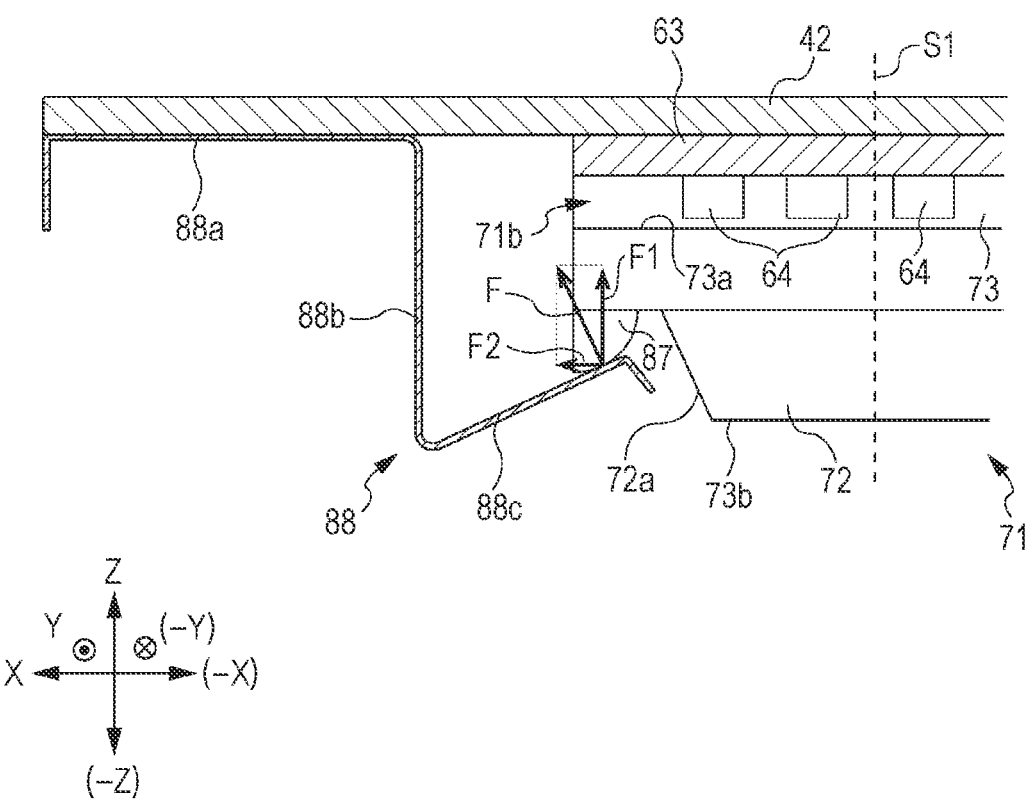
FIG. 18 is an enlarged view of a relevant part of an end of a lamp according to the first exemplary embodiment in the main scanning direction.

FIG. 18 is an enlarged view of a relevant part of an end of the lamp 7 according to the first exemplary embodiment in the main scanning direction.

Referring to FIGS. 3B and 11, the light guide 71 according to the first exemplary embodiment has a guide body 72 having a trapezoidal cross-sectional shape whose width in the left-right direction decreases toward the read position 6 as an example of a radiation position disposed therebelow. Referring to FIGS. 11 and 18, front and rear ends, which are ends in the main scanning direction, of the guide body 72 according to the first exemplary embodiment are provided with inclined surfaces 72a that are inclined upward, that is, toward the substrates 63, as the inclined surfaces 72a extend outward in the front-rear direction. The inclined surfaces 72a are provided for avoiding interference with the leaf springs, to be described below, as well as for improving mold release properties when forming the light guide 71. Therefore, with the inclined surfaces 72a, a compact configuration and improved precision of the light guide 71 may be achieved, as compared with a case where the inclined surfaces 72a are not provided. The inclined surfaces 72a according to the first exemplary embodiment are formed into rough surfaces for diffusely reflecting light so that the light from the LED chips 64 may be prevented from being reflected in a specific direction by the inclined surfaces 72a. Although the inclined surfaces 72a are roughened in the first exemplary embodiment for reducing reflection, the inclined surfaces 72a may alternatively be coated with so-called coatings for reducing reflection.

Referring to FIG. 18, in the light guide 71 according to the first exemplary embodiment, the inclined surfaces 72a and the LED chips 64 disposed at the outer ends in the front-rear direction are disposed outside outer edges S1 of a recording sheet S having a predetermined maximum readable size.

Referring to FIGS. 15 and 16, the upper surface of the light guide 71 is provided with a groove 73 extending in the front-rear direction. The groove 73 is capable of accommodating the LED chips 64 therein and is provided for forming a gap 71b through which air flows for cooling the LED units 62 that generate heat between the LED chips 64. Therefore, the base surface of the groove 73 constitutes an input section 73a through which the light from the LED chips 64 is input to the light guide 71, and the lower surface of the guide body 72 constitutes an output section 73b from which the input light is output toward the read position 6. Accordingly, in the light guide 71, the light input through the input section 73a is transmitted through the guide body 72 and is also reflected at the left and right inclined surfaces 72a of the guide body 72 having the trapezoidal cross-sectional shape so as to be guided toward the output section 73b, whereby the light is output toward the read position 6 from the output section 73b.

Referring to FIGS. 3B, 11, and 16, in the light guide 71 according to the first exemplary embodiment, the left and right sides of the guide body 72 are integrally provided with edge sections 74 extending in the front-rear direction. Referring to FIGS. 15 and 16, a central area, a front end, and a rear end, in the front-rear direction, of the right edge section 74 are respectively provided with protrusions 76, 77, and 78 that protrude rightward.

A positioning pin 81 as an example of a first positioned section protrudes upward from the front side of the central protrusion 76, and a positioning pin 82 as an example of a third positioned section protrudes upward from the rear side of the central protrusion 76. In the first exemplary embodiment, the front positioning pin 81 has an outer diameter that corresponds to the inner diameter of the circular hole 47 in the metal plate 42, and has a columnar shape with an outer diameter that corresponds to the width, in the left-right direction, of the long hole 63b in the corresponding LED unit 62.

The rear positioning pin 82 has the same outer diameter as the front positioning pin 81, that is, a smaller diameter than the inner diameter of the clearance hole 49 in the metal plate 42, and has a columnar shape with an outer diameter that corresponds to the inner diameter of the circular hole 63a in the corresponding LED unit 62.

Furthermore, a positioning pin 83 as an example of a second positioned section protrudes upward from the protrusion 77 at the front end, and a positioning pin 84 as an example of a second positioned section protrudes upward from the protrusion 78 at the rear end. The positioning pins 83 and 84 at the front and rear ends in the first exemplary embodiment have a columnar shape with an outer diameter that corresponds to the width, in the left-right direction, of the long holes 48 in the metal plate 42.

Furthermore, the left edge section 74 is provided with ribs 86 as an example of contact sections at positions corresponding to the protrusions 76 to 78. The ribs 86 extend upward and come into contact with the lower surfaces of the substrates 63. Therefore, as shown in FIG. 3B, in areas where the ribs 86 are not provided, slits 71c as an example of gaps that connect the gap 71b to the outside so as to allow air for releasing heat and for cooling to travel therethrough are formed between the lower surfaces of the substrates 63 and the upper surfaces of the edge sections 74.

Referring to FIG. 17, the front end and the rear end of the light guide 71 are provided with semispherical protrusions 87 as an example of contact sections that protrude downward at the front side and the rear side of the guide body 72.

Referring to FIG. 3B, FIGS. 10 to 15, and FIG. 18, leaf springs 88 as an example of retaining members are supported at the outer sides of the light guide 71 in the front-rear direction. The leaf springs 88 according to the first exemplary embodiment have fixed portions 88a supported by the holes 51 to 54, which are provided at the front and rear ends of the metal plate 42, via screws 89, vertical plates 88b extending downward from the fixed portions 88a, and pressing plates 88c extending upward slantwise from the ends of the vertical plates 88b toward the protrusions 87.

Therefore, in the first exemplary embodiment, the leaf springs 88 retain the light guide 71 by causing the pressing plates 88c to press the protrusions 87 at the ends of the light guide 71 toward the metal plate 42 so that the light guide 71 is supported relative to the metal plate 42. In this case, in the first exemplary embodiment, the pressing force applied by the leaf springs 88 is set in advance such that the force is sufficient for bending the warped light guide 71 in FIG. 17 into a shape that conforms to the shape of the metal plate 42.

Furthermore, referring to FIG. 18, the lower end of each vertical plate 88b according to the first exemplary embodiment is positioned lower than the lower end of the corresponding protrusion 87. Therefore, the contact position between the pressing plate 88c and the protrusion 87 is located inward of the outer end of the protrusion 87 in the front-rear direction so that a force F acting on the contact position includes not only a force component F1 acting in a direction in which the pressing plate 88c presses the protrusion 87 toward the metal plate 42, but also a force component F2 acting in a direction in which the protrusion 87 is pressed outward in the front-rear direction. Specifically, the leaf springs 88 according to the first exemplary embodiment press the light guide 71 toward the metal plate 42 and also apply a force that pulls the light guide 71 outward in the front-rear direction.

The leaf springs 88 according to the first exemplary embodiment are composed of metal having higher rigidity than the rigidity of the protrusions 87, namely, the rigidity of the light guide 71 formed integrally with the protrusions 87.

Referring to FIGS. 3B, 10 and 11, a clip 91 as an example of a retaining member is attached to the central area of the light guide 71 in the front-rear direction. The clip 91 according to the first exemplary embodiment is formed of a metallic leaf spring and includes an upper plate 91a that is in contact with the upper surface of the flat plate portion 43 of the metal plate 42, and a lower plate 91b that is bent so as to extend downward around the metal plate 42 and the light guide 71 from the right end of the upper plate 91a and that is in contact with the lower surface of the central protrusion 76 of the light guide 71. The upper plate 91a according to the first exemplary embodiment has clearance holes 91c through which the positioning pins 81 and 82 extending through the circular hole 47, the long hole 63b, the clearance hole 49, and the circular hole 63a can extend.

Therefore, the clip 91 according to the first exemplary embodiment is attached in a state where the clip 91 clamps the light guide 71, the LED units 62, the insulator 61, and the metal plate 42 together, such that the light guide 71 and the like are retained in a state where the central area thereof in the front-rear direction is pressed toward the metal plate 42 by the clip 91.

Operation of Light Source Units According to First Exemplary Embodiment

In each of the lamps 7 in the image reading device Sc according to the first exemplary embodiment, the light guide 71 is positioned relative to the metal plate 42 in the front-rear direction and the left-right direction by engaging the positioning pin 81 disposed in the central area in the front-rear direction with the circular hole 47. Furthermore, the light guide 71 is positioned in the left-right direction by engaging the positioning pins 83 and 84 at the front and rear ends with the long holes 48 in the metal plate 42. The positioning pin 82 disposed at the rear side of the central area in the front-rear direction extends through the clearance hole 49 in the metal plate 42.

Therefore, the light guide 71 according to the first exemplary embodiment is retained by the metal plate 42 while being positioned at a predetermined position by engaging the positioning pins 81 to 84 with the holes 47 to 49 in the metal plate 42. In particular, in the lamp 7 according to the first exemplary embodiment, the positioning pins 83 and 84 at the front and rear ends are disposed distant from the central positioning pin 81 in the longitudinal direction so that positional displacement may be reduced, as compared with a case where the positioning pins 83 and 84 are disposed close to the central positioning pin 81.

In the lamp 7, the light guide 71 may sometimes thermally expand or contract due to heat generated by the LED units 62 as light is radiated or due to a temperature change in the room where the printer U is installed. Supposing that positioning is performed by engaging a positioning pin at one end in the front-rear direction with a circular hole, the effect of expansion or contraction at the other end tends to increase with increasing length in the longitudinal direction. Therefore, if the light guide 71 is longitudinally bent in the front-rear direction due to a production error, an assembly error, or the like, the effect of the bending increases at the other end, possibly leading to a deviation of the optical axis, that is, a bent optical axis. This may deteriorate the image reading accuracy, resulting in lower image quality. In order to reduce this effect, a configuration for correcting the deviation of the optical axis may be disposed at the other end. However, this is a problem in terms of an increase in overall size due to an increased number of components and a space ensured for disposing such a deviation correcting configuration.

In contrast, in the lamp 7 according to the first exemplary embodiment, the positioning is performed by using the central positioning pin 81, and the distance from the positioned central area to each end is shorter than the distance from one longitudinal end to the other end, so that the effect of expansion and contraction of the light guide 71 may be readily reduced. Accordingly, in the lamp 7 according to the first exemplary embodiment, an adverse effect of heat may be reduced, and the size thereof is reduced due to a reduced number of components, as compared with the case where the aforementioned deviation correcting configuration is provided at the other end.

In particular, unlike a document reading device that reads a document in a state where the document is secured above a glass plate or the document is automatically transported and pressed against the glass plate, the image reading device Sc according to the first exemplary embodiment reads a recording sheet S that is transported without being pressed against a glass plate or the like. Thus, the recording sheet S tends to fluctuate relative to the read position 6 in the thickness direction of the recording sheet S, that is, the radiating direction of light. Therefore, the light radiated from the lamp 7 should have enough illuminance within a certain range in the radiating direction. In other words, a sufficient depth of illuminance should be ensured. Therefore, in the image reading device Sc according to the first exemplary embodiment, the light guide 71 should have higher precision than that of the aforementioned document reading device. In order to achieve this, the light guide 71 in the lamp 7 according to the first exemplary embodiment is reliably positioned with reference to the metal plate 42 having higher rigidity than the light guide 71, so that the optical-axis direction of guided light is set. Consequently, in the lamp 7 according to the first exemplary embodiment, the overall configuration is reduced in size, and the positioning is reliably performed so that the depth of illuminance may be readily ensured.

Furthermore, in the lamp 7 according to the first exemplary embodiment, both ends of the light guide 71 are supported in a state where the protrusions 87 are pressed by the leaf springs 88. Therefore, both ends are supported in a movable manner in the front-rear direction and the left-right direction, unlike a case where both ends are fixed with screws. In the configuration in which both ends are fixed with screws, since the ends of the light guide 71 are restrained and are restricted from deforming, if the light guide 71 thermally expands or contracts, the light guide 71 may become distorted or bent, possibly resulting in adverse effects, such as a bent optical axis of the guided light or a variation in illuminance. In contrast, in the first exemplary embodiment in which both ends are pressed by the leaf springs 88, the protrusions 87 move in the front-rear direction and the left-right direction when the light guide 71 expands or contracts, thereby reducing the occurrence of distortion or the like in the light guide 71. Therefore, an adverse effect of heat on the light guide 71 may be reduced, thereby reducing the occurrence of, for example, a bent optical axis or a variation in illuminance.

In particular, in the first exemplary embodiment, the leaf springs 88 that press both ends of the light guide 71 also apply the force component F2 that presses the protrusions 87 outward in the front-rear direction so that the light guide 71 is pulled outward in the front-rear direction. If such a pulling force is not applied to the light guide 71, the light guide 71 may possibly bend relative to the front-rear direction when the light guide 71 expands or contracts. In contrast, in the first exemplary embodiment, the light guide 71 is pulled outward so that bending of the light guide 71 may be reduced, thereby reducing the occurrence of a bent optical axis.

Furthermore, in the lamp 7 according to the first exemplary embodiment, when an external force is not applied to the light guide 71, as shown in FIG. 17, the light guide 71 has a warped shape such that one end thereof in the front-rear direction extends away from the metal plate 42 and the like relative to the other end thereof. Supposing that one end extends toward the metal plate 42 relative to the other end, the central area of the light guide 71 in the front-rear direction would be in a floating state from the flat plate portion 43 of the metal plate 42 when both ends are pressed by the leaf springs 88. In this case, even if the central area in the front-rear direction is fastened with a screw, there is still a possibility that the segment between the front end and the central area and the segment between the central area and the rear end may be in a floating state from the flat plate portion 43. Thus, the light guiding performance may fluctuate in the front-rear direction, possibly resulting in unstable radiated light. Furthermore, even if the light guide 71 is set in parallel with the flat plate portion 43 of the metal plate 42, there is still a possibility that one end may warp toward the metal plate 42 relative to the other end due to a production error or the like, possibly resulting in unstable radiated light.

In contrast, in the first exemplary embodiment, the light guide 71 warps away from the metal plate 42, and the rigidity of the light guide 71 is lower than that of the metal plate 42. Thus, when both ends are pressed by the leaf springs 88, the light guide 71 deforms so as to conform to the shape of the flat plate portion 43 of the metal plate 42, whereby a fixed distance between the light guide 71 and the flat plate portion 43 may be readily achieved entirely in the front-rear direction. In particular, in the first exemplary embodiment, the light guide 71 is positioned by using the positioning pin 81 in the central area in the front-rear direction and is retained by the clip 91 so that the front and rear ends are pressed against the flat plate portion 43 with reference to the central area. As compared with a case where one end is pressed relative to the other end, the amount of deformation is smaller when both ends are pressed with reference to the central area in the case of the same warpage, thereby readily achieving high precision.

When the warped light guide 71 is pressed, a force that makes the light guide 71 elastically recover its original state acts on the light guide 71, whereby a force acting inward in the front-rear direction is generated. Supposing that the leaf springs 88 only apply the force component F1 that presses the protrusions 87 toward the flat plate portion 43, the protrusions 87 may possibly slide inward in the axial direction relative to the leaf springs 88. If thermal contraction occurs, the protrusions 87 may possibly become detached from the leaf springs 88. In contrast, in the first exemplary embodiment, the leaf springs 88 that press both ends of the light guide 71 also apply the force component F2 that presses the protrusions 87 outward in the front-rear direction, so that the sliding of the protrusions 87 relative to the leaf springs 88 may be reduced.

Figure 19A:
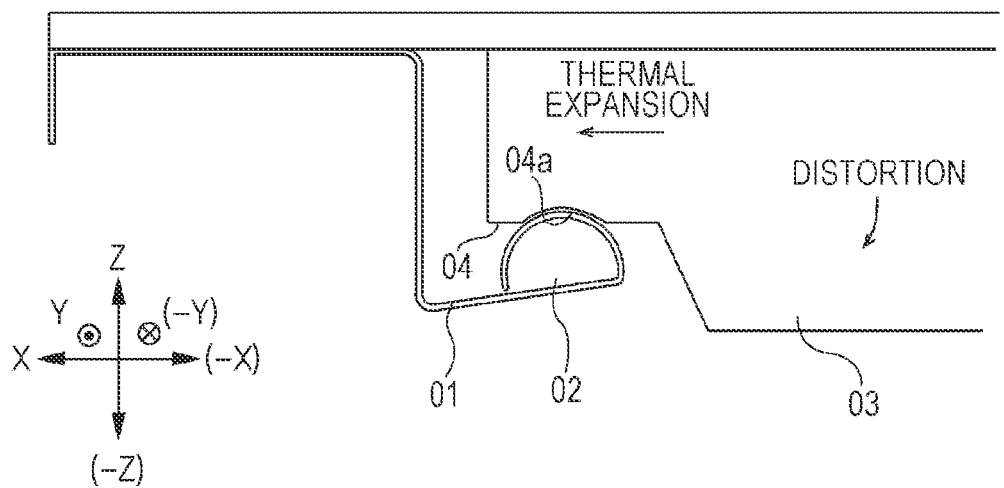
FIGS. 19A and 19B illustrates a retaining member, FIG. 19A illustrating a case where a protrusion is provided on the retaining member, FIG. 19B illustrating a state where a protrusion is abraded in the configuration according to the first exemplary embodiment.
Figure 19B:
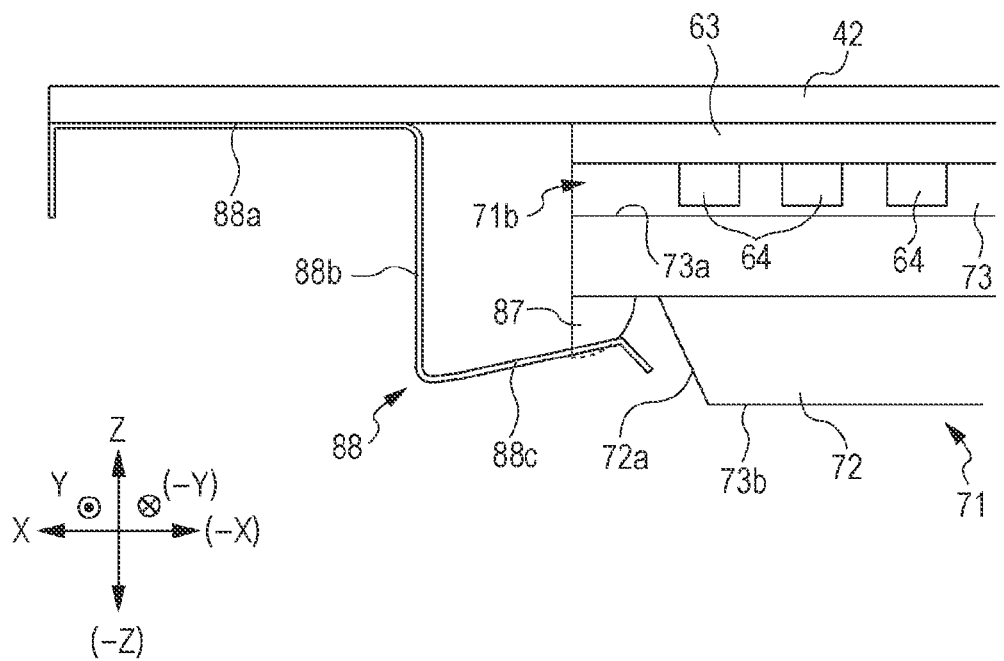

FIGS. 19A and 19B illustrates a retaining member. Specifically, FIG. 19A illustrates a case where a protrusion is provided on the retaining member, and FIG. 19B illustrates a state where a protrusion is abraded in the configuration according to the first exemplary embodiment.

In the first exemplary embodiment, the rigidity of the protrusions 87 is lower than the rigidity of the leaf springs 88, the protrusions 87 are formed on the light guide 71, and the leaf springs 88 are constituted of the flat pressing plates 88c. Supposing that the leaf springs 88 have lower rigidity, when the leaf springs 88 press against the protrusions 87, it is difficult for the leaf springs 88 to press the protrusions 87 sufficiently since the leaf springs 88 with the lower rigidity may readily deform. In FIG. 19A, a leaf spring 01 with high rigidity is provided with a protrusion 02, whereas a light guide 03 has a flat surface 04. In this case, when the protrusion 02 and the flat surface 04 come into contact with each other, there is a possibility that a contact area 04a on the flat surface 04 of the light guide 03 with the lower rigidity may become deformed, abraded, or cut out so as to become depressed. If the light guide 03 thermally expands or contracts in the front-rear direction from the state shown in FIG. 19A, the protrusion 02 may get caught in the depressed area, possibly hindering the movement of the light guide 03 in the front-rear direction and distorting the light guide 03.

In contrast, in the first exemplary embodiment, the protrusions 87 are formed on the light guide 71 so that even when the protrusions 87 become abraded, as shown in FIG. 19B, the movement of the light guide 71 may be prevented from being hindered, thereby reducing distortion of the light guide 71. Consequently, the occurrence of a bent optical axis and the like may be reduced.

FIGS. 20A to 20C illustrate light-quantity distribution of light radiated from the lamp 7. Specifically, FIG. 20A illustrates a case where there are no light source portions disposed outside the outer edges of a maximum-size recording sheet S, FIG. 20B illustrates a case where a configuration for reducing reflection is not provided at each of the inclined surfaces 72a of the light guide 71, and FIG. 20C illustrates light-quantity distribution in the configuration according to the first exemplary embodiment.

Referring to FIG. 20A, in the case where there are no LED chips 64 disposed outside the outer edges S1 of the maximum-size recording sheet S, light enters an area S2 other than the outer edges S1 not only from LED chips 64a at the corresponding positions but also from both sides in the front-rear direction so that a sufficient light quantity is ensured. However, the outer edges S1 do not receive light from the outside in the front-rear direction, possibly resulting in a lack of light quantity. On the other hand, as shown in FIG. 20B, when there are LED chips 64 disposed outside the outer edges S1, if the configuration for reducing reflection is not provided at each inclined surface 72a, a position S3 with a locally large light quantity is generated at the inner side in the front-rear direction due to the light reflected at the inclined surface 72a, possibly resulting in the occurrence of a variation in light-quantity distribution in the front-rear direction.

In contrast, in the first exemplary embodiment, as shown in FIG. 20C, each inclined surface 72a is roughened for reducing reflection, thereby reducing the occurrence of a lack of light quantity at the outer edge S1 and also suppressing the occurrence of the position S3 with a locally large light quantity. Therefore, a variation in radiated light is reduced, thereby achieving improved image reading accuracy.

Furthermore, in the lamp 7 according to the first exemplary embodiment, the LED units 62 are positioned by inserting the positioning pins 81 to 84 of the light guide 71 through the circular holes 63a and the long holes 63b. Consequently, the LED chips 64 are positioned relative to the light guide 71, and the LED units 62 are positioned relative to the metal plate 42 via the light guide 71. If the LED units 62 have an additional configuration for positioning them relative to the metal plate 42 without using the positioning pins 81 to 84 of the light guide 71, positional displacement between the LED chips 64 and the light guide 71 may possibly occur if the precision between the components to be positioned differs therebetween. However, in the first exemplary embodiment that uses the positioning pins 81 to 84, the LED chips 64 and the light guide 71 are positioned with high accuracy, so that the occurrence of a deviated optical axis and a variation in light-quantity distribution may be reduced.

In particular, in the LED units 62 according to the first exemplary embodiment, the rigidity of the substrates 63 is set to be lower than the rigidity of the metal plate 42. Thus, the substrates 63 deform together with the light guide 71 pressed by the clip 91 and the leaf springs 88 so as to be fixed with reference to the metal plate 42. Therefore, similar to the light guide 71, the LED units 62 and the insulator 61 are also positioned relative to the metal plate 42. Thus, as compared with a case where the LED units 62 and the insulator 61 are positioned relative to different components, improved accuracy may be readily achieved in the first exemplary embodiment in which the LED units 62 and the insulator 61 are positioned with reference to a common component.

Furthermore, in the first exemplary embodiment, two LED units 62 are arranged at the front and rear sides, respectively. Although it is possible to arrange the LED chips 64 in the front-rear direction on a single substrate 63, the positions of the LED chips 64 may tend to vary due to a production error as the length increases in the front-rear direction. In contrast, in the first exemplary embodiment, two LED units 62 are positioned and supported so that a variation in the positions of the LED chips 64 in each LED unit 62 may be suppressed, thereby reducing the occurrence of a bent optical axis, a variation in light-quantity distribution, and the like.

Furthermore, in the lamp 7 according to the first exemplary embodiment, the metal plate 42 is composed of a metallic material with relatively high thermal conductivity, and the insulator 61 is composed of a material with high thermal conductivity, so that the heat generated at the LED units 62 may be readily conducted and released. Specifically, the metal plate 42 also functions as a heat releasing member or a so-called heat sink, so that thermal expansion of the light guide 71 may be reduced, as compared with a case where the metal plate 42 does not have a function of a heat sink.

Furthermore, in the lamp 7 according to the first exemplary embodiment, the gap 71b is formed between the light guide 71 and the LED chips 64, so that the gap 71b and the outside are connected to each other via the slits 71c. Therefore, the amount of heat accumulating at the LED chips 64 may be reduced, thereby reducing the occurrence of thermal expansion of the light guide 71 caused when the light guide 71 is heated.

Second Exemplary Embodiment

Figure 21:
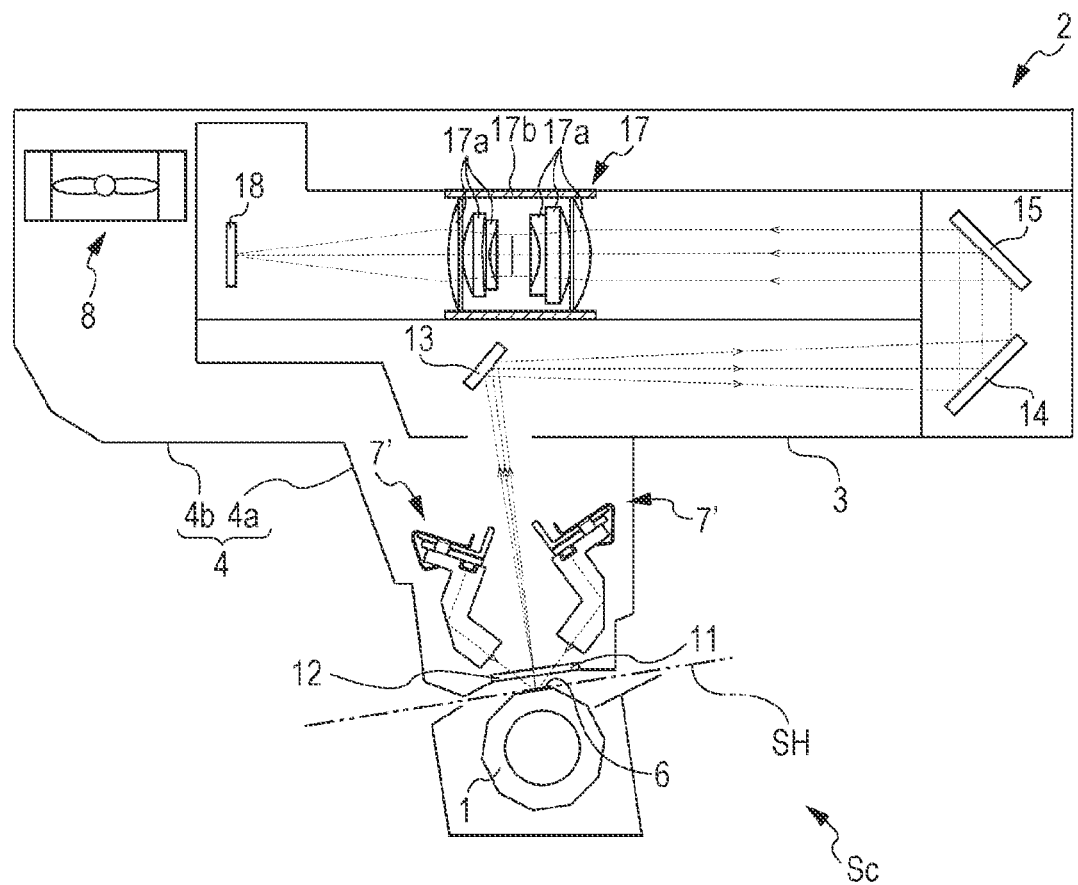
FIG. 21 illustrates an image reading device according to a second exemplary embodiment of the present invention and corresponds to FIG. 3A in the first exemplary embodiment.

FIG. 21 illustrates an image reading device according to a second exemplary embodiment of the present invention and corresponds to FIG. 3A in the first exemplary embodiment.

Figure 22:
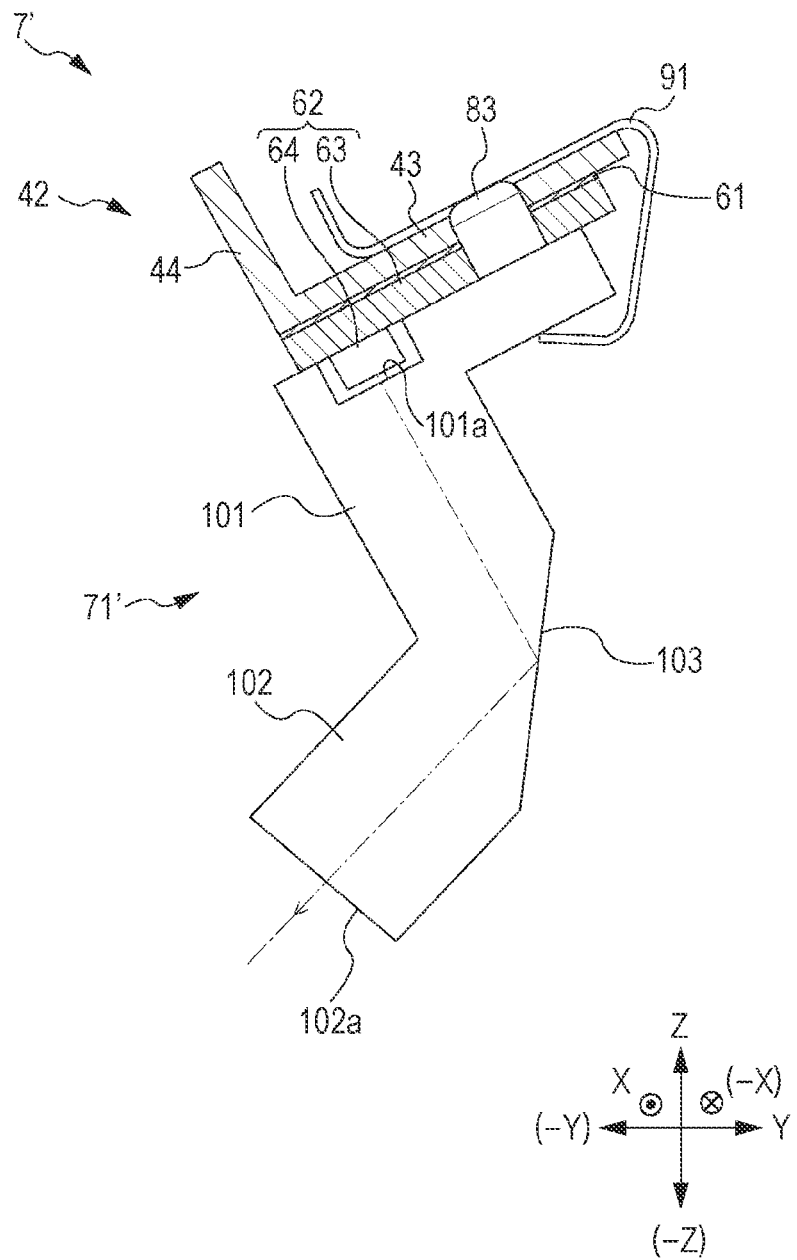
FIG. 22 is an enlarged view of one of light source units according to the second exemplary embodiment and corresponds to FIG. 3B in the first exemplary embodiment.

FIG. 22 is an enlarged view of one of light source units according to the second exemplary embodiment and corresponds to FIG. 3B in the first exemplary embodiment.

Figure 23:
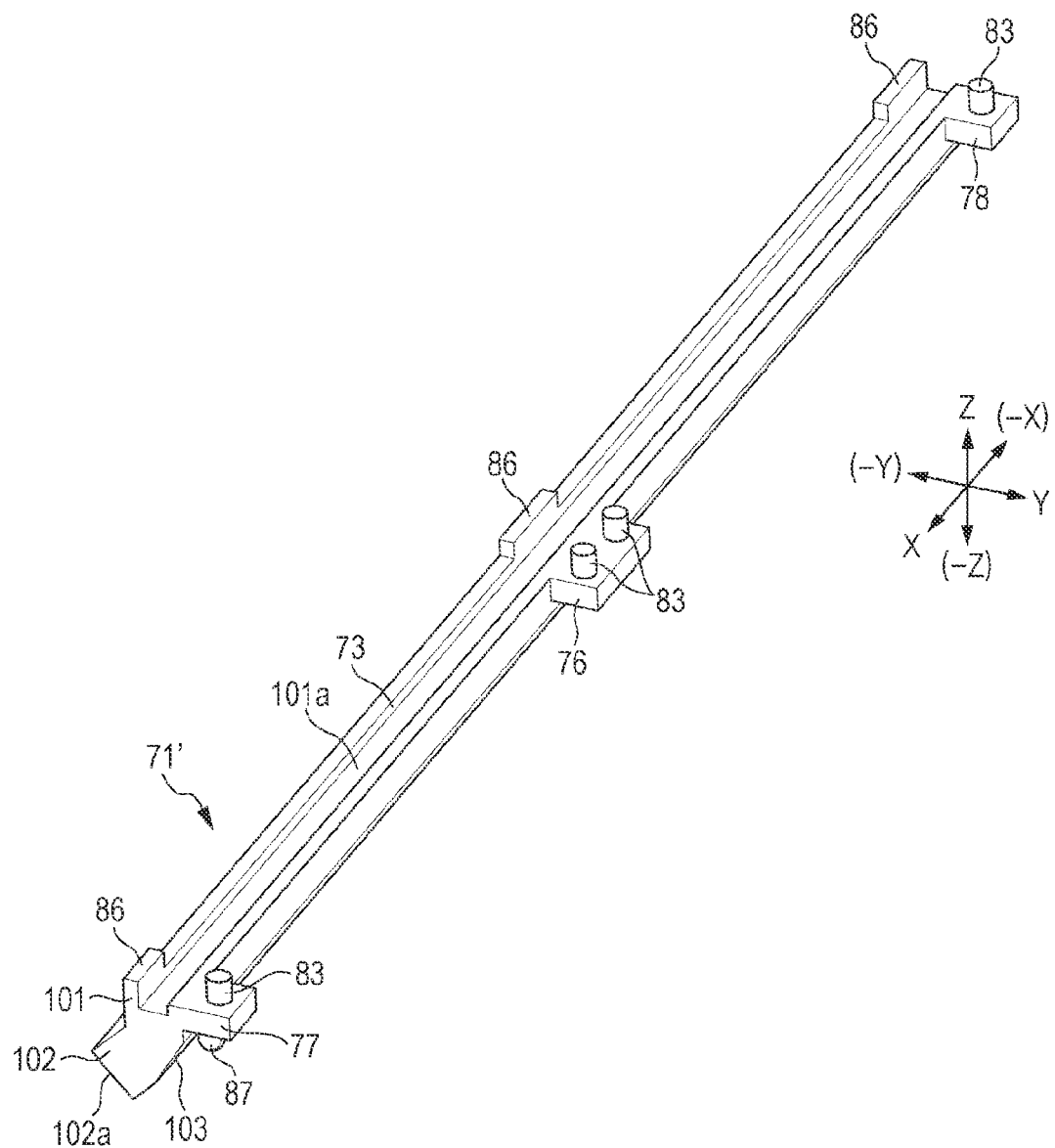
FIG. 23 is a perspective view of a light guide member according to the second exemplary embodiment.

FIG. 23 is a perspective view of a light guide member according to the second exemplary embodiment.

Although the light source units according to the second exemplary embodiment of the present invention will be described below, components that correspond to those in the first exemplary embodiment will be given the same reference numerals in the description of the second exemplary embodiment, and detail descriptions thereof will be omitted. Although the second exemplary embodiment differs from the first exemplary embodiment with respect to the following points, the second exemplary embodiment is similar to the first exemplary embodiment with respect to other points.

Referring to FIG. 21, similar to the first exemplary embodiment, a pair of lamps 7' as an example of light source units according to the second exemplary embodiment are disposed in a symmetric arrangement at the upstream side and the downstream side in the transport direction of the recording sheet S. The following description will only be directed to the lamp 7' at the downstream side, and a description of the lamp 7' at the upstream side will be omitted.

Referring to FIGS. 21 to 23, the lamp 7' according to the second exemplary embodiment is similar to that in the first exemplary embodiment except for having a light guide 71' that is different from that in the first exemplary embodiment.

The light guide 71' according to the second exemplary embodiment includes a first body 101 extending downward along light radiated from the LED chips 64, and a second body 102 extending toward the read position 6 from the lower end of the first body 101. Similar to the first exemplary embodiment, the upper end of the first body 101 is provided with the groove 73 that accommodates the LED chips 64, and a light input section 101a is formed at the upper end of the first body 101.

A lower right section between the first body 101 and the second body 102 is provided with a reflective section 103 that reflects light input through the input section 101a, and a lower left end of the second body 102 is provided with an output section 102a from which the light reflected by the reflective section 103 is output.

Since the light guide 71' according to the second exemplary embodiment is similar to the light guide 71 according to the first exemplary embodiment in that it is supported in a positioned state, a detailed description thereof will be omitted.

Operation of Light Source Units According to Second Exemplary Embodiment

Each lamp 7' according to the second exemplary embodiment having the above-described configuration are similar to each lamp 7 according to the first exemplary embodiment in that the light guide 71' is positioned at the central area thereof in the front-rear direction relative to the metal plate 42, and both ends of the light guide 71' are pressed by the leaf springs 88 so as to be retained to the metal plate 42. Therefore, similar to the first exemplary embodiment, the lamp 7' according to the second exemplary embodiment may achieve improved positioning accuracy and reduced adverse effects of a bent optical axis and thermal expansion.

Modifications

Although the exemplary embodiments of the present invention have been described in detail above, the present invention is not to be limited to the above exemplary embodiments and permits various modifications within the technical scope of the invention defined in the claims. Modifications H01 to H015 will be described below.

In a first modification H01, the image forming apparatus according to each of the above exemplary embodiments is not limited to the printer U, but may be, for example, a copier, a facsimile device, or a multifunction apparatus having multiple or all functions of such devices.

In the above exemplary embodiments, the printer U is configured to use developers of five colors. Alternatively, in a second modification H02, the above exemplary embodiments may be applied to, for example, a monochrome image forming apparatus or a multicolor image forming apparatus that uses four colors or fewer, or six colors or more.

In the above exemplary embodiments, the optical system 13+14+15 is constituted of three mirrors. Alternatively, in a third modification H03, the number of mirrors may be arbitrarily changed to, for example, two or fewer, or four or more. Furthermore, although plate-shaped reflecting mirrors are described as an example of optical members, the optical members may be alternative reflecting mirrors, such as cylindrical mirrors, spherical mirrors, or parabolic mirrors, or transmissive lenses, such as focusing lenses, in accordance with the shape and the width of the optical path.

In the above exemplary embodiments, two LED units 62 are arranged in the front-rear direction. Alternatively, in a fourth modification H04, depending on the allowable precision, a production error, and the like, a single substrate or three or more substrates may be arranged in the front-rear direction.

In the above exemplary embodiments, the metal plate 42 has a function of a heat sink. Alternatively, in a fifth modification H05, an additional heat sink may be disposed in contact with the LED units 62 or the light guide 71 or 71'.

In a sixth modification H06, the shapes of the leaf springs 88 and 88' and the clip 91 in the above exemplary embodiments are not limited to those described in the exemplary embodiments and may be arbitrarily changed depending on design, specifications, and the like. Furthermore, although the central area in the front-rear direction is clamped by the clip 91 in the first exemplary embodiment, the central area in the front-rear direction may alternatively be fastened by using a screw.

The insulator 61 is provided in the above exemplary embodiments. Alternatively, in a seventh modification H07, a non-conductive metal plate may alternatively be used, or the insulator 61 may be omitted so long as the insulation is achieved by another technique. Moreover, although the insulator 61 is composed of a material with high thermal conductivity, the insulator 61 may alternatively be composed of a material with low thermal conductivity if only a small amount of heat is generated or if heat can be sufficiently released via a heat sink disposed directly in contact with the LED units 62.

In the second exemplary embodiment, an adjustment screw 116 is provided such that an adjustment is performed by fastening or loosening the screw. Alternatively, in an eighth modification H08, for example, the adjustment may be performed by another adjustment technique, such as using a piezoelectric element. Moreover, the adjustment screw 116 may alternatively be omitted.

In the above exemplary embodiments, the leaf springs 88 and 88' are configured to pull the protrusions 87 and 87' outward in the front-rear direction. Alternatively, in a ninth modification H09, the leaf springs 88 and 88' may be configured not to pull protrusions 87 and 87' outward in the front-rear direction.

In the above exemplary embodiments, the protrusions 87 and 87' are described as having semispherical shapes. Alternatively, in a tenth modification H010, the protrusions 87 and 87' may have a freely-chosen shape, such as a columnar shape, a conical shape, a prismatic shape, or a pyramidal shape.

In the above exemplary embodiments, the light guides 71 and 71' are warped in a direction away from the metal plates 42 and 42' when external force is not applied to the light guides 71 and 71'. Alternatively, in an eleventh modification H011, the light guides 71 and 71' may have a non-warped shape, depending on the allowable precision, a production error, and the like.

In the above exemplary embodiments, the chart is printed by the marking unit U1a. Alternatively, in a twelfth modification H012, an image whose colors and image position are measured in advance may be transported from one of the feed trays TR1 to TR4 so as to be read by the image reading device Sc without performing an image forming process thereon.

In the above exemplary embodiments, the image reading device Sc is disposed at a position where a recording sheet S having undergone a fixing process, a cooling process, and a decurling process can be read so that an image that is to be actually viewed by the user can be read. Alternatively, in a thirteenth modification H013, the image reading device Sc may be disposed at a freely-chosen position, such as a position immediately downstream of the fixing device F or a position immediately in front of the inversion path or the stacker tray TRh, if allowed by the demanded image quality or the specifications. Instead of disposing the image reading device Sc in the transport path SH, it may also be possible to have the image reading device Sc built inside a document image reader, i.e., a so-called image scanner. In that case, a recording sheet S having undergone a printing process and output onto the stacker tray TRh may be set on the image scanner so as to be read by the image reading device Sc.

In the first exemplary embodiment, each of the inclined surfaces 72a is provided with the configuration for reducing reflection. Alternatively, in a fourteenth modification H014, such a configuration may be omitted, for example, if a position with a locally large light quantity is disposed outside the corresponding outer edge S1 or if the inclination angle is small to an extent that a position with a locally large light quantity is rarely generated.

The inclined surfaces 72a are provided in the first exemplary embodiment. Alternatively, in a fifteenth modification H015, for example, steps may be provided in place of the inclined surfaces, or the guide body 72 may extend to the edges.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading device comprising:
   a light source member having a plate-shaped substrate extending in a predetermined main scanning direction, and a plurality of light source portions releasing light and supported by the substrate in the main scanning direction;

a light guide member having an input section disposed facing the light source portions and to which the light released from the light source portions is input, and an output section from which the input light is output, the light guide member guiding the light toward a predetermined radiation position;

a support member that supports the light source member and the light guide member and that has higher rigidity than the light guide member and the substrate of the light source member;

a first positioning section that is provided in a central area of the support member in the main scanning direction and that positions the light guide member in the main scanning direction and a sub scanning direction intersecting the main scanning direction;

a second positioning section that is provided at an end of the support member in the main scanning direction and that positions the light guide member in the sub scanning direction; and a reader member that receives the light from the radiation position so as to read an image of the radiation position, wherein the second positioning section permits the light guide member to move in the main scanning direction.

2. The image reading device according to claim 1, wherein the substrate includes a plurality of substrates.

3. The image reading device according to claim 1, wherein the support member is formed of a metal plate.

4. The image reading device according to claim 1, further comprising a retaining member that is composed of a resilient material and that sandwiches the light guide member and the support member so as to retain the light guide member in a supported state relative to the support member.

5. The image reading device according to claim 1, further comprising an insulation member disposed between the substrate of the light source member and the support member so as to insulate the substrate and the support member from each other.

6. The image reading device according to claim 1, wherein the light guide member further has a reflective section that reflects the light input from the input section toward the output section.

7. The image reading device according to claim 1, further comprising an adjusting member that deforms the light guide member by pressing the light guide member from a direction intersecting an optical axis along which the light guided by the light guide member travels so as to adjust the optical axis, the adjusting member adjusting an amount of deformation of the light guide member by adjusting a pressing amount applied to the light guided member by the adjusting member so as to adjust the optical axis of the light output from the output section.

8. An image forming apparatus comprising:
an image recorder that records an image onto a medium; and
the image reading device according to claim 1 that reads the image recorded by the image recorder.

9. The image reading device according to claim 1, wherein the first positioning section positions the light guide member in the main scanning direction and the sub scanning direction by completely restricting the light guide member from moving in the main scanning direction and the sub scanning direction.

10. The image reading device according to claim 1, wherein the first positioning section is a circular through hole in the support member.

11. The image reading device according to claim 1, wherein the second positioning section is a long-shaped hole in the support member.

12. The image reading device according to claim 11, wherein the first positioning section is a circular through hole in the support member.

13. An image reading device comprising:
a light source member having a plate-shaped substrate extending in a predetermined main scanning direction, and a plurality of light source portions releasing light and supported by the substrate in the main scanning direction;

a light guide member having an input section disposed facing the light source portions and to which the light released from the light source portions is input, and an output section from which the input light is output, the light guide member guiding the light toward a predetermined radiation position;

a support member that supports the light source member and the light guide member and that has higher rigidity than the light guide member and the substrate of the light source member;

a first positioning section that is provided in a central area of the support member in the main scanning direction and that positions the light guide member in the main scanning direction and a sub scanning direction intersecting the main scanning direction;

a second positioning section that is provided at an end of the support member in the main scanning direction and that positions the light guide member in the sub scanning direction; and a reader member that receives the light from the radiation position so as to read an image of the radiation position, wherein the first positioning section blocks any movement of the light guide member in the main scanning direction and the sub scanning direction, and the second positioning section blocks any movement of the light guide member in the sub scanning direction and permits the light guide member to move in the main scanning direction.

14. An apparatus comprising:
a substrate extending in a first direction and supporting a plurality of light sources arranged along the substrate in the first direction;

a light guide member configured to guide light from the plurality of light sources toward a radiation position; and a support member that supports the substrate and the light guide member, the supporting including a first positioning section in a central area of the support member in the first direction and a second positioning section at an end of the support member in the first direction, the first positioning section restricting movement of the light guide member in the first direction and a second direction that is orthogonal to the first direction, the second positioning section restricting movement of the light guide member in the second direction and permitting movement of the light guide member in the first direction.

* * * * *